United States Patent
Raghavan et al.

(10) Patent No.: US 12,004,108 B2
(45) Date of Patent: Jun. 4, 2024

(54) TIMING ADJUSTMENTS FOR COOPERATIVE BEAMFORMING

(71) Applicant: QUALCOMM Incorporated, San Diego, CA (US)

(72) Inventors: Vasanthan Raghavan, West Windsor Township, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 327 days.

(21) Appl. No.: 17/485,021

(22) Filed: Sep. 24, 2021

(65) Prior Publication Data

US 2023/0100704 A1    Mar. 30, 2023

(51) Int. Cl.
*H04W 56/00* (2009.01)
*H04B 7/0408* (2017.01)

(52) U.S. Cl.
CPC ...... *H04W 56/0045* (2013.01); *H04B 7/0408* (2013.01); *H04W 56/0015* (2013.01)

(58) Field of Classification Search
None
See application file for complete search history.

(56) References Cited

U.S. PATENT DOCUMENTS

| | | |
|---|---|---|
| 2013/0114455 A1 | 5/2013 | Yoo et al. |
| 2016/0036571 A1 | 2/2016 | Park et al. |
| 2019/0281571 A1* | 9/2019 | Ren .................. H04W 74/08 |
| 2022/0085943 A1* | 3/2022 | Zhu ................... H04L 5/0051 |
| 2022/0141676 A1* | 5/2022 | Wang ................. H04B 7/026 370/329 |
| 2023/0188308 A1* | 6/2023 | Karjalainen ......... H04B 7/0408 370/336 |

OTHER PUBLICATIONS

International Search Report and Written Opinion—PCT/US2022/075575—ISA/EPO—dated Nov. 18, 2022 (2103067WO).

* cited by examiner

*Primary Examiner* — Marcus Smith
(74) *Attorney, Agent, or Firm* — Holland & Hart LLP/Qualcomm Incorporated

(57) ABSTRACT

Methods, systems, and devices for wireless communications are described. A user equipment (UE) may indicate timing alignment factors in support of timing alignment adjustments by a base station or one or more transmission reception points (TRPs). Such timing adjustments may be in the context of cooperative beamforming and may relate to the timing with which the TRPs transmit respective instances of downlink transmissions to the UE. In some cases, the UE may report absolute timing alignment factors to support such timing alignment adjustments. Additionally or alternatively, the UE may report relative timing alignment factors, for example compared to signals received from a reference TRP, to support such timing alignment adjustments.

30 Claims, 16 Drawing Sheets

TIMING ADJUSTMENTS FOR COOPERATIVE BEAMFORMING

FIELD OF TECHNOLOGY

The following relates to wireless communications, including timing adjustments for cooperative beamforming.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE may be configured to communicate with one or more transmission reception points (TRPs) using beamforming techniques. But in some situations, existing beamforming techniques may be deficient.

SUMMARY

The described techniques relate to improved methods, systems, devices, and apparatuses that support timing adjustments for cooperative beamforming. Generally, the described techniques provide for enabling a user equipment (UE) and a base station to implement timing alignment adjustments in support of cooperative beamforming procedures. In some examples, the base station may adjust the timing with which one or more transmission reception points (TRPs) transmit respective instances of the same downlink transmissions to the UE based on timing alignment factors indicated by the UE.

The UE may indicate to the base station a capability associated with measuring and reporting timing alignment factors for multiple TRPs, along with a capability associated with co-phasing factor estimation, to support timing alignment adjustment and enable coherent processing of transmissions from multiple TRPs. In some cases, the UE may report absolute timing alignment factors for the TRPs to determine timing alignment adjustments. Additionally or alternatively, the UE may report relative timing alignment factors for the TRPs, for example compared to a reference TRP. In some examples, based on a request from the base station, the UE may report timing alignment factors for co-phasing signals sent on different beams from the multiple TRPs. In some cases, the UE may transmit to a base station a request for a timing alignment adjustment with respect to a specific set of TRPs. In some cases, if the UE has a low capability (e.g., a low ability to estimate timing alignment factors, a co-phasing factor, or both), the UE may use alternative methods to process transmissions from multiple TRPs.

A method for wireless communications at a user equipment (UE) is described. The method may include receiving, from a base station, a request for timing alignment information associated with a set of TRPs, transmitting, based on receiving the request, a report including one or more timing alignment factors for the set of TRPs, and receiving a downlink transmission from the set of TRPs according to a beamforming configuration based on the one or more timing alignment factors, where receiving the downlink transmission according to the beamforming configuration includes receiving a respective instance of the downlink transmission from each TRP of the set of TRPs.

An apparatus for wireless communications at a UE is described. The apparatus may include a processor of a UE, memory in electronic communication with the processor, and the memory and the processor configured to receive, from a base station, a request for timing alignment information associated with a set of TRPs, transmit, based on receiving the request, a report including one or more timing alignment factors for the set of TRPs, and receive a downlink transmission from the set of TRPs according to a beamforming configuration based on the one or more timing alignment factors, where receiving the downlink transmission according to the beamforming configuration includes receiving a respective instance of the downlink transmission from each TRP of the set of TRPs.

Another apparatus for wireless communications at a UE is described. The apparatus may include means for receiving, from a base station, a request for timing alignment information associated with a set of TRPs, means for transmitting, based on receiving the request, a report including one or more timing alignment factors for the set of TRPs, and means for receiving a downlink transmission from the set of TRPs according to a beamforming configuration based on the one or more timing alignment factors, where receiving the downlink transmission according to the beamforming configuration includes receiving a respective instance of the downlink transmission from each TRP of the set of TRPs.

A non-transitory computer-readable medium storing code for wireless communications at a UE is described. The code may include instructions executable by a processor to receive, from a base station, a request for timing alignment information associated with a set of TRPs, transmit, based on receiving the request, a report including one or more timing alignment factors for the set of TRPs, and receive a downlink transmission from the set of TRPs according to a beamforming configuration based on the one or more timing alignment factors, where receiving the downlink transmission according to the beamforming configuration includes receiving a respective instance of the downlink transmission from each TRP of the set of TRPs.

Some examples of the method, apparatuses, and non-transitory computer-readable medium described herein may further include operations, features, means, or instructions for receiving respective signaling from each TRP of the set of TRPs, where the report including the one or more timing alignment factors may be transmitted based on the respective signaling.

In some examples of the method, apparatuses, and non-transitory computer-readable medium described herein, the respective signaling from each TRP includes a respective channel state information reference signal from each TRP, a respective synchronization signal block from each TRP, or both.

Some examples of the method, apparatuses, and non-transitory computer-readable medium described herein may further include operations, features, means, or instructions for transmitting, to the base station, signaling indicating a capability associated with timing estimation for signals received from multiple TRPs, where the request for timing alignment information may be received based on transmitting the signaling indicating the capability.

In some examples of the method, apparatuses, and non-transitory computer-readable medium described herein, the signaling indicating the capability includes one or more bit fields each associated with at least one of a quality of cluster delay spread estimation at the UE or a quality of co-phasing factor estimation at the UE.

Some examples of the method, apparatuses, and non-transitory computer-readable medium described herein may further include operations, features, means, or instructions for identifying a reference TRP of the set of TRPs based on receiving the request for timing alignment information and comparing second signaling from a second TRP of the set of TRPs with first signaling from the reference TRP to determine a relative timing alignment factor for the second TRP, where the one or more timing alignment factors transmitted in the report include the relative timing alignment factor for the second TRP.

Some examples of the method, apparatuses, and non-transitory computer-readable medium described herein may further include operations, features, means, or instructions for transmitting, to the base station after identifying the reference TRP, signaling indicating the reference TRP.

Some examples of the method, apparatuses, and non-transitory computer-readable medium described herein may further include operations, features, means, or instructions for receiving first signaling from a first TRP of the set of TRPs, receiving second signaling from a second TRP of the set of TRPs, and determining a first timing alignment factor associated with the first TRP based on the first signaling and a second timing alignment factor associated with the second TRP based on the second signaling, where the second timing alignment factor may be independent of the first timing alignment factor, and where the one or more timing alignment factors transmitted in the report include the first timing alignment factor and the second timing alignment factor.

Some examples of the method, apparatuses, and non-transitory computer-readable medium described herein may further include operations, features, means, or instructions for transmitting, to the base station, signaling indicating the set of TRPs for timing alignment, where the request for timing alignment information may be received based on transmitting the signaling indicating the set of TRPs.

In some examples of the method, apparatuses, and non-transitory computer-readable medium described herein, receiving the downlink transmission according to the beamforming configuration may include operations, features, means, or instructions for receiving the respective instance of the downlink transmission from each TRP of the set of TRPs according to a cyclic delay diversity (CDD) scheme.

Some examples of the method, apparatuses, and non-transitory computer-readable medium described herein may further include operations, features, means, or instructions for determining one or more time offsets associated with the CDD scheme for the set of TRPs, where the one or more timing alignment factors transmitted in the report include the one or more time offsets.

In some examples of the method, apparatuses, and non-transitory computer-readable medium described herein, receiving the respective instance of the downlink transmission from each TRP according to the CDD scheme may include operations, features, means, or instructions for receiving a first instance of the downlink transmission from a first TRP of the set of TRPs based on a first time offset of the one or more time offsets associated with the CDD scheme and receiving a second instance of the downlink transmission from a second TRP of the set of TRPs based on a second time offset of the one or more time offsets associated with the CDD scheme, where the second time offset may be different from the first time offset.

A method for wireless communications at a base station is described. The method may include transmitting, to a UE, a request for timing alignment information associated with a set of TRPs, receiving, based on transmitting the request, a report including one or more timing alignment factors for the set of TRPs, and transmitting a downlink transmission using the set of TRPs according to a beamforming configuration based on the one or more timing alignment factors, where transmitting the downlink transmission according to the beamforming configuration includes transmitting a respective instance of the downlink transmission to the UE using each TRP of the set of TRPs.

An apparatus for wireless communications at a base station is described. The apparatus may include a processor of the base station, memory in electronic communication with the processor, and the memory and the processor configured to transmit, to a UE, a request for timing alignment information associated with a set of TRPs, receive, based on transmitting the request, a report including one or more timing alignment factors for the set of TRPs, and transmit a downlink transmission using the set of TRPs according to a beamforming configuration based on the one or more timing alignment factors, where transmitting the downlink transmission according to the beamforming configuration includes transmitting a respective instance of the downlink transmission to the UE using each TRP of the set of TRPs.

Another apparatus for wireless communications at a base station is described. The apparatus may include means for transmitting, to a UE, a request for timing alignment information associated with a set of TRPs, means for receiving, based on transmitting the request, a report including one or more timing alignment factors for the set of TRPs, and means for transmitting a downlink transmission using the set of TRPs according to a beamforming configuration based on the one or more timing alignment factors, where transmitting the downlink transmission according to the beamforming configuration includes transmitting a respective instance of the downlink transmission to the UE using each TRP of the set of TRPs.

A non-transitory computer-readable medium storing code for wireless communications at a base station is described. The code may include instructions executable by a processor to transmit, to a UE, a request for timing alignment information associated with a set of TRPs, receive, based on transmitting the request, a report including one or more timing alignment factors for the set of TRPs, and transmit a downlink transmission using the set of TRPs according to a beamforming configuration based on the one or more timing alignment factors, where transmitting the downlink transmission according to the beamforming configuration includes transmitting a respective instance of the downlink transmission to the UE using each TRP of the set of TRPs.

Some examples of the method, apparatuses, and non-transitory computer-readable medium described herein may further include operations, features, means, or instructions for transmitting respective signaling using each TRP of the set of TRPs, where the report including the one or more timing alignment factors may be received based on the respective signaling.

In some examples of the method, apparatuses, and non-transitory computer-readable medium described herein, the respective signaling transmitted using each TRP includes a respective channel state information reference signal from each TRP, a respective synchronization signal block from each TRP, or both.

Some examples of the method, apparatuses, and non-transitory computer-readable medium described herein may further include operations, features, means, or instructions for receiving, from the UE, signaling indicating a capability associated with timing estimation for signals received at the UE from TRPs, where the request for timing alignment information may be transmitted based on receiving the signaling indicating the capability.

In some examples of the method, apparatuses, and non-transitory computer-readable medium described herein, the signaling indicating the capability includes one or more bit fields each associated with at least one of a quality of cluster delay spread estimation at the UE or a quality of co-phasing factor estimation at the UE.

Some examples of the method, apparatuses, and non-transitory computer-readable medium described herein may further include operations, features, means, or instructions for identifying a reference TRP of the set of TRPs, where the request for timing alignment information may be transmitted based on determining the reference TRP and identifying a relative timing alignment factor for a second TRP and associated with the reference TRP, where the one or more timing alignment factors received in the report include the relative timing alignment factor for the second TRP.

Some examples of the method, apparatuses, and non-transitory computer-readable medium described herein may further include operations, features, means, or instructions for receiving, from the UE before identifying the reference TRP, signaling indicating the reference TRP.

Some examples of the method, apparatuses, and non-transitory computer-readable medium described herein may further include operations, features, means, or instructions for identifying a first timing alignment factor associated with a first TRP of the set of TRPs based on receiving the report, identifying a second timing alignment factor associated with a second TRP based on receiving the report, where the second timing alignment factor may be independent of the first timing alignment factor, and where the one or more timing alignment factors received in the report include the first timing alignment factor and the second timing alignment factor, transmitting a first instance of the downlink transmission using the first TRP based on identifying the first timing alignment factor, and transmitting a second instance of the downlink transmission using the second TRP based on identifying the second timing alignment factor, where transmitting the respective instance of the downlink transmission using each TRP of the set of TRPs includes transmitting the first instance of the downlink transmission using the first TRP and transmitting the second instance of the downlink transmission using the second TRP.

Some examples of the method, apparatuses, and non-transitory computer-readable medium described herein may further include operations, features, means, or instructions for receiving, from the UE, signaling indicating the set of TRPs for timing alignment, where the request for timing alignment information may be transmitted based on receiving the signaling indicating the set of TRPs.

In some examples of the method, apparatuses, and non-transitory computer-readable medium described herein, transmitting the downlink transmission according to the beamforming configuration may include operations, features, means, or instructions for transmitting the respective instance of the downlink transmission using each TRP of the set of TRPs according to a CDD scheme.

In some examples of the method, apparatuses, and non-transitory computer-readable medium described herein, the one or more timing alignment factors received in the report include one or more time offsets associated with the CDD scheme for the set of TRPs.

In some examples of the method, apparatuses, and non-transitory computer-readable medium described herein, transmitting the respective instance of the downlink transmission using each TRP according to the CDD scheme may include operations, features, means, or instructions for transmitting a first instance of the downlink transmission using a first TRP of the set of TRPs based on a first time offset of the one or more time offsets associated with the CDD scheme and transmitting a second instance of the downlink transmission using a second TRP of the set of TRPs based on a second time offset of the one or more time offsets associated with the CDD scheme, where the second time offset may be different from the first time offset.

DETAILED DESCRIPTION

Figure 1:
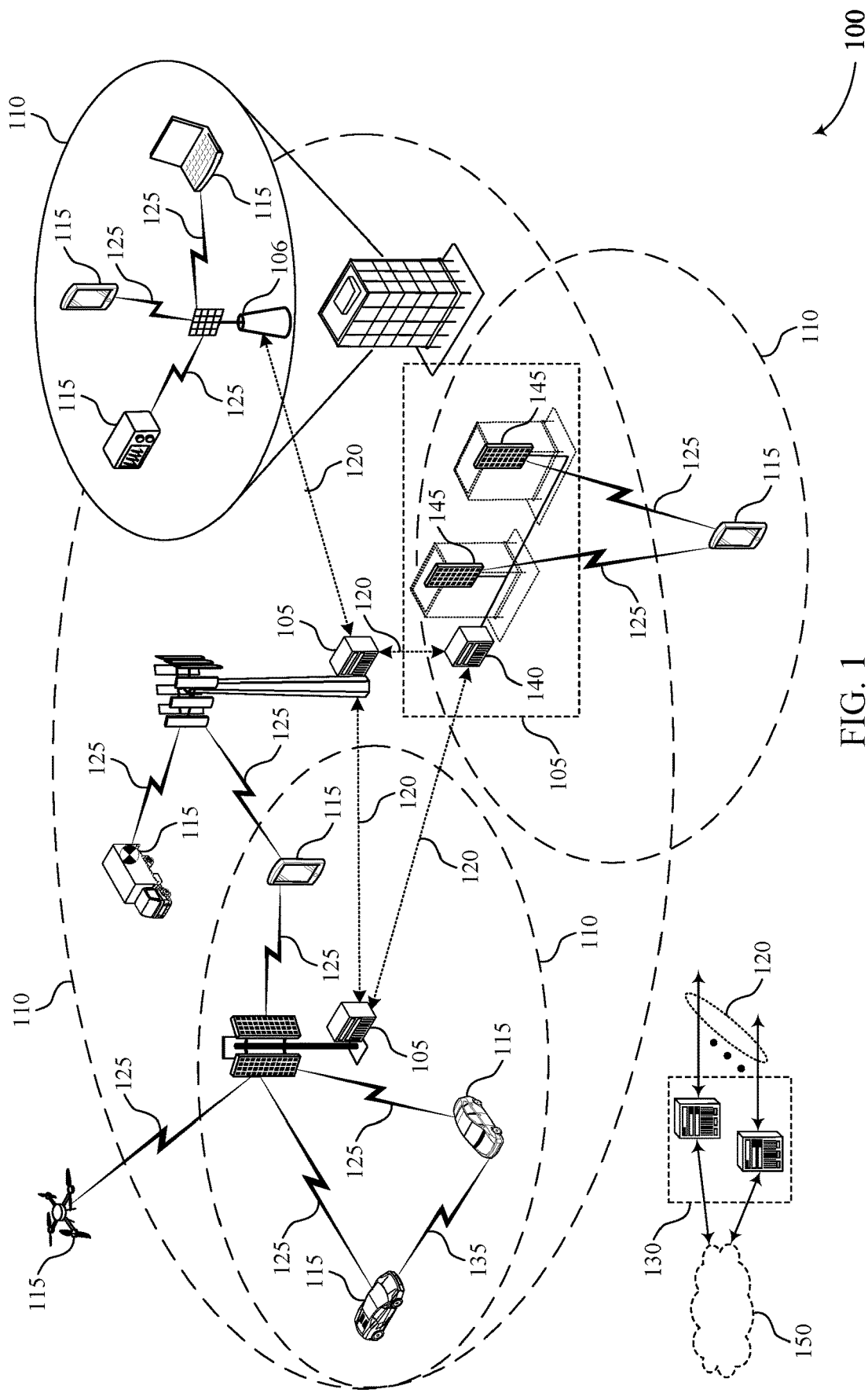
FIG. 1 illustrates an example of a wireless communications system that supports timing adjustments for cooperative beamforming in accordance with aspects of the present disclosure.

In some deployments, wireless communications systems may operate in millimeter wave (mmW) frequency ranges (e.g., 24 gigahertz (GHz), 26 GHz, 28 GHz, 39 GHz, 52.6-71 GHz, 71-114.25 GHz, among other examples). Wireless communications at these frequencies may be associated with increased signal attenuation (e.g., path loss, penetration loss, blockage loss), which may be influenced by various factors, such as diffraction, propagation environment, density of blockages, material properties, etc. Due to the increased amount of path, penetration and blockage losses in mmW communications systems, transmissions between wireless devices (e.g., from a base station or a user equipment (UE)) may be beamformed to coherently combine energy and overcome the path losses at these frequencies. Additionally, or alternatively, a receiving device may use beamforming techniques to configure one or more antennas, which may be included in an antenna array or an antenna array module, such that transmissions are received in a directional manner.

A UE may communicate with a base station using beamformed transmissions. In some cases, the UE may receive downlink transmissions from multiple transmission reception points (TRPs), where two or more TRPs (or relay nodes, sidelink UEs, repeaters) may each send respective beams conveying the same information to the UE from different directions, which may be referred to as cooperative beamforming, with such beams referred to as cooperative beams. In some cases, the different cooperative beams may not all arrive at the UE at the same time. For example, clusters (e.g., objects that direct energy to the UE) associated with the beams may introduce different timing delays for the beams, along with the different TRPs possibly having different separation distances from the UE. In some cases, cooperative beams may also experience destructive interference, for example based on phase or timing differences, which may impact signal quality and user experience at the UE.

To avoid destructive interference, the UE may use a co-phasing factor to coherently combine energy of cooperative beams from multiple TRPs (e.g., the TRPs may configure the beam phases to constructively interfere) so that the UE receives the beams with a single set of beam weights for a reception beam. Although co-phasing influences beam weights to avoid destructive interference, there may still be different timing delays associated with the different beams from different TRPs from the UE perspective.

According to the techniques described herein, a UE and a base station may implement timing alignment adjustments in support of cooperative beamforming, possibly along with use of a co-phasing factor. In some examples, the base station may adjust the timing with which one or more TRPs transmit respective instances of the same downlink transmissions to the UE based on timing alignment factors indicated by the UE. The UE may indicate to the base station a capability associated with measuring and reporting timing alignment factors for multiple TRPs, possibly along with a capability associated with co-phasing factor estimation, to support timing alignment adjustment and enable coherent processing of transmissions from multiple TRPs.

In some cases, the UE may report absolute timing alignment factors for the TRPs to determine timing alignment adjustments. Additionally or alternatively, the UE may report relative timing alignment factors for the TRPs, for example as compared to a reference TRP. In some examples, based on a request from the base station, the UE may report timing alignment factors for co-phasing signals sent on different beams from two or more TRPs specified by the base station. In some cases, the UE may request a specific set of TRPs for which to perform the timing alignment adjustment. In some cases, if the UE has a low capability (e.g., a low ability to estimate timing alignment factors, a co-phasing factor, or both), the UE may use alternative methods to process coherent transmissions from multiple TRPs as described herein.

Particular aspects of the subject matter described herein may be implemented to realize one or more advantages. The described techniques may support improvements for timing adjustments in cooperative beamforming by reducing system latency and improving user experience. As such, supported techniques may include improved network operations and, in some examples, may promote network efficiencies, among other benefits.

Aspects of the disclosure are initially described in the context of wireless communications systems. Aspects of the disclosure are also illustrated by and described with reference to a process flow. Aspects of the disclosure are further illustrated by and described with reference to apparatus diagrams, system diagrams, and flowcharts that relate to timing adjustments for cooperative beamforming.

FIG. 1 illustrates an example of a wireless communications system 100 that supports timing adjustments for cooperative beamforming in accordance with aspects of the present disclosure. The wireless communications system 100 may include one or more base stations 105, one or more UEs 115, one or more TRPs 106, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots.

Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or TRPs 106. Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115, the base stations 105, and the TRPs 106, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE- Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105, a TRP 106, or a UE 115 may be equipped with multiple antennas, which may be used to employ techniques such as transmit diversity, receive diversity, multiple-input multiple-output (MIMO) communications, or beamforming. The antennas of a base station 105, a TRP 106, or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 or a TRP 106 may have an antenna array with a number of rows and columns of antenna ports that the base station 105 or the TRP 106 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105, the TRPs 106, or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a TRP 106, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105, a TRP 106, or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105 or a TRP 106, or by a receiving device, such as a UE 115) a beam direction for later transmission or reception by the base station 105 or the TRP 106.

Some signals, such as data signals associated with a particular receiving device, may be transmitted by a base station 105 or a TRP 106 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 or the TRP 106 in different directions and may report to the base station 105 or the TRP 106 an indication of the signal that the UE 115 received with a highest signal quality or an otherwise acceptable signal quality.

In some examples, transmissions by a device (e.g., by a base station 105, a TRP 106, or a UE 115) may be performed using multiple beam directions, and the device may use a combination of digital precoding or radio frequency beamforming to generate a combined beam for transmission (e.g., from a base station 105 or a TRP 106 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105 or a TRP 106, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a UE 115 may communicate with a base station 105 using beamformed transmissions. In some cases, the UE 115 may receive downlink transmissions from multiple TRPs 106, where two or more TRPs 106 (or relay nodes, sidelink UEs, repeaters) may send the same information to the UE 115 from different directions using cooperative beamforming. In some cases, the different cooperative beams may not all arrive at the UE 115 at the same time. In some cases, the cooperative beams may also experience destructive interference, for example based on phase or timing differences, which may impact signal quality and user experience at the UE 115. To avoid destructive interference, the UE 115 may use a co-phasing factor to coherently combine energy of beams from multiple TRPs 106 (e.g., the TRPs 106 may configure the beam phases to constructively interfere) so that the UE 115 receives the beams with a single set of beam weights for a reception beam. Although co-phasing may influence beam weights to avoid destructive interference, there may still be different timing delays associated with the different TRPs 106 from the UE perspective.

According to the techniques described herein, a UE 115 and a base station 105 may implement timing alignment adjustments in support of cooperative beamforming. In some examples, the base station 105 (or the TRPs 106 themselves) may adjust the timing with which one or more TRPs 106 transmit respective instances of the same downlink transmissions to the UE 115 based on timing alignment factors indicated by the UE 115. The UE 115 may indicate to the base station 105 a capability associated with measuring and reporting timing alignment factors for multiple TRPs 106, along with a capability associated with co-phasing factor estimation, to support timing alignment adjustment and enable coherent processing of transmissions from multiple TRPs 106. In some cases, the UE 115 may report absolute timing alignment factors for the TRPs 106 to determine timing alignment adjustments. Additionally or alternatively, the UE 115 may report relative timing alignment factors for the TRPs 106, as compared to a reference TRP 106. In some examples, based on a request from the base station 105, the UE 115 may report timing alignment factors for co-phasing signals sent on different beams from the multiple TRPs 106 (e.g., with the multiple TRPs 106 indicated as part of the request). In some cases, the UE 115 may request a specific set of TRPs 106 for which to report timing alignment factors. In some cases, if the UE 115 has a low capability (e.g., a low ability to estimate timing alignment factors, a co-phasing factor, or both), the UE 115 may use alternative methods to process coherent transmissions from multiple TRPs 106.

Figure 2:
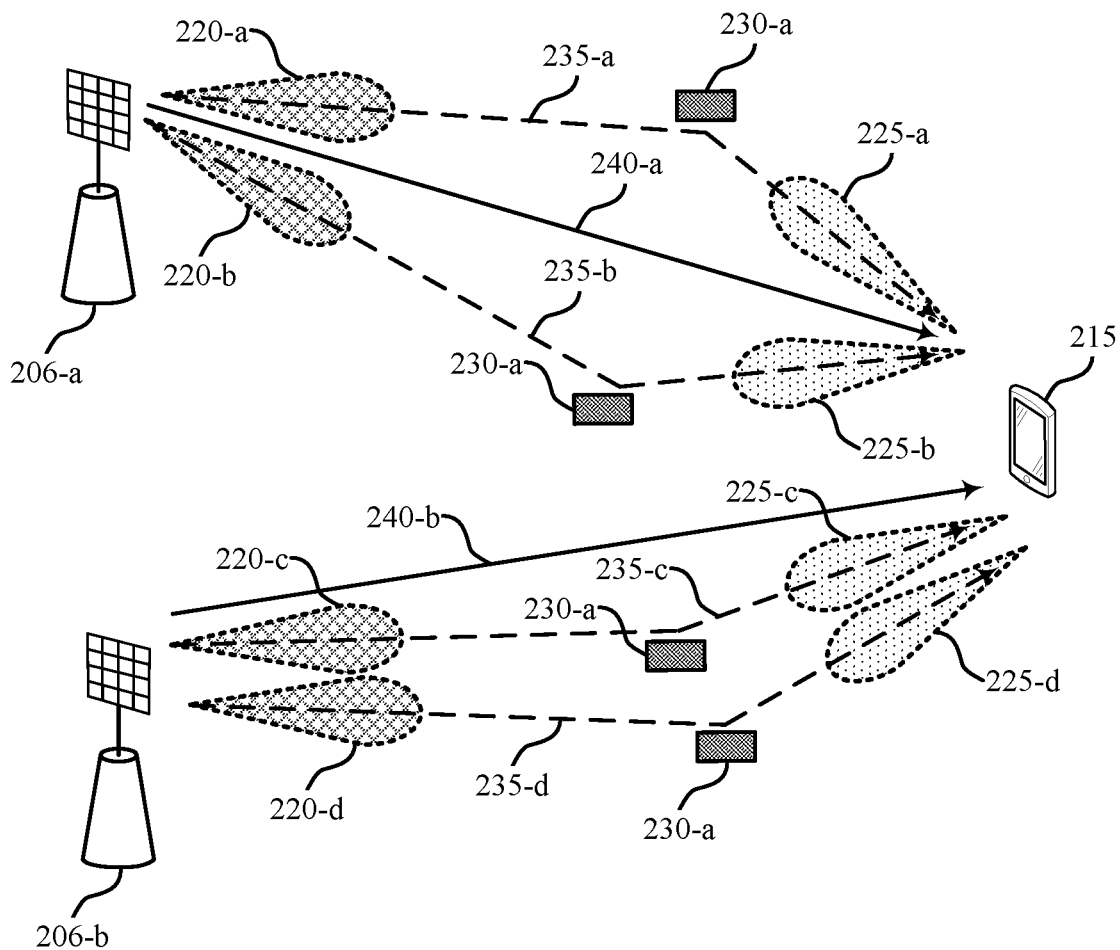
FIG. 2 illustrates an example of a wireless communications system that supports timing adjustments for cooperative beamforming in accordance with aspects of the present disclosure.

FIG. 2 illustrates an example of a wireless communications system 200 that supports timing adjustments for cooperative beamforming in accordance with aspects of the present disclosure. In some examples, the wireless communications system 200 may implement aspects of the wireless communications system 100 or may be implemented by aspects of the wireless communications system 100. For example, the wireless communications system 200 may include a UE 215 and a set of TRPs 206, which may be examples of corresponding devices described herein with reference to FIG. 1. The wireless communications system 200 may include features for improved communications between the UE 215 and the TRPs 206, among other benefits.

The TRP 206-a and the TRP 206-b may communicate with the UE 215 using beamforming techniques. The TRPs may be controlled by a single base station (e.g., a base station 105 as described with reference to FIG. 1) or by separate base stations (e.g., base stations 105). In some cases, the TRPs 206 and the UE 215 may communicate with one another via one or more TRP beams 220 and one or more UE beams 225. Individual TRP beams 220 may correspond to individual UE beams 225 for communications in the wireless communications system 200. In some examples, the communications illustrated in FIG. 2 may include downlink transmissions to the UE 215, where the TRP beams 220 may be transmission beams and the UE beams 225 may be reception beams. Additionally or alternatively, the communications illustrated in FIG. 2 may include uplink transmissions from the UE 215, where the TRP beams 220 may be reception beams and the UE beams 225 may be transmission beams.

In some examples, the UE 215 may receive downlink transmissions from the TRPs 206 (or relay nodes, sidelink UEs, repeaters), where the TRPs 206 may send the same information to the UE 215 from different directions via different beams using cooperative beamforming. Cooperative beamforming may include a multi-TRP transmission, or a base station transmitting a beam to the UE 215 with support or assistance from one or more relay nodes (e.g., a reflective surface), each of which may act as assistive devices that may reflect the energy from the base station to the UE 215 in a pre-determined direction or in an adaptive direction to improve coverage in the case of blockage, fading, and the like. While FIG. 2 shows two TRPs 206 communicating with the UE 215, cooperative beamforming may also include transmissions between a different set of two or more devices (e.g., a TRP 206, a relay node, two UEs in sidelink communications), for example as coordinated by the base station.

In some cases, downlink transmissions to the UE 215 from the TRP beams 220 may occur along clusters or paths 235. In some cases, a cluster may refer to an object in a channel (e.g., a path 235) that may reflect energy to the receive node (e.g., the UE beams 225). For example, a TRP beam 220 may reflect off of a reflection 230 (e.g., a metallic or glass object) and therefore its energy may be directed to the UE 215. The reflections 230 may introduce a time delay between different TRP beams 220. For example, based on the respective directions of the TRP beams 220 and the reflections 230, the corresponding path lengths and timing delays may differ.

In some cases, the TRP 206-a may transmit the same symbols to the UE 215 using two TRP beams 220 (e.g., TRP beams 220 may be cooperative beams), and the UE 215 may receive the symbols via the UE beams 225. For example, a TRP beam 220-a may transmit along a path 235-a and a reflection 230-a to the UE beam 225-a, and the TRP beam 220-b may transmit along a path 235-b and a reflection 230-b to the UE beam 225-b. In some cases, the TRP 206-b may transmit the same symbols to the UE 215 using two different TRP beams 220, and the UE 215 may receive the symbols via a different set of UE beams 225. For example, the TRP beam 220-c may transmit along a path 235-c and a reflection 230-c to the UE beam 225-c, and the TRP beam 220-d may transmit along a path 235-d and a reflection 230-d to the UE beam 225-d. In some cases, factors such as differences in separation distances or channel conditions (e.g., including the reflections 230, such as reflectivity properties of the clusters through which reflections may occur) may create timing differences between two TRP beams 220 carrying the same information to the UE 215.

In some cases, the different TRP beams 220 may not all arrive at the UE 215 at the same time. Additionally or alternatively, the TRP beams 220 may also experience destructive interference, for example based on phase or timing differences, which may impact signal quality and user experience at the UE 215. To avoid destructive interference, the UE 215 may use a co-phasing factor to coherently combine energy of TRP beams 220 from multiple TRPs 206 (e.g., the TRPs 206 may configure the beam phases such that the TRP beams 220 constructively interfere) so that the UE 215 receives the TRP beams 220 via the UE beams 225 (e.g., reception beams) each having the same set of beam weights. In some cases, the co-phasing factor may determine which UE beams 225 the UE 215 may use to receive transmissions from the TRPs 206. For example, the UE 215 may determine a beam weight based on the co-phasing factor to avoid interference of multiple TRP beams 220 (e.g., a beam associated with a highest signal strength out of a set of candidate beams may be used to receive the TRP beams 220). Although such co-phasing techniques may mitigate destructive interference, there may still be different timing delays associated with the different TRPs 206 from the perspective of the UE 215.

In some cases, the UE 215 may construct an ideal candidate UE beam 225 to maximize the rate at which the UE 215 may receive transmit beams 220, which may include feedback of the co-phasing factor from the UE 215 to the TRPs 206. In some cases, the TRPs 206 may construct an ideal candidate TRP beam 220 to maximize the rate at which the TRPs 206 may receive uplink transmissions (e.g., with beam correspondence). In some cases, the UE 215 may report timing delays across TRPs 206, and the TRPs 206 with the most compatible timing delay may be selected based on the report (e.g., instead of being selected based on reference signal received power (RSRP) alone). In some cases, for single frequency network (SFN) transmissions, a timing delay adjustment from TRPs 206 may be used to avoid poor signal combinations.

In some cases when using a co-phasing factor to combine TRP beams 220 across paths 235 in a channel, each path 235 has a discrete delay, and therefore a path length difference (e.g., there is a path length difference between the path 235-a and the path 235-b). To determine the co-phasing factor, the UE 215 may group the discrete delays corresponding to the arrival of one or more dominant clusters from the TRPs 206 in a common discrete delay bin. If the UE 215 identifies different delays from different signals (e.g., beams), it may implement a timing advance or a timing lag so that the signals may be combined spatially (e.g., constructive interference) and temporally (e.g., in the time domain using a timing adjustment). In some cases, a discrete delay $D_1$ for an lth cluster may be given by:

$$D_l = \left\lceil \frac{\tau_l}{\frac{1}{\Delta_f N_{FFT}}} \right\rceil, \quad (1)$$

where $\tau_l$ may represent a delay (e.g., a continuous delay) associated with the lth cluster, $\Delta_f$ may represent a subcarrier spacing, and $N_{FFT}$ may represent a fast Fourier transform (FFT) size used for performing multi-carrier transmissions, where $\Delta_f N_{FFT} = W$ may represent a bandwidth. In general, the delays corresponding to each path 235 from each TRP 206 may be distinct (e.g., different). For example, a signal with a longer path 235 may arrive later at the UE 215 than a signal with a shorter path 235 carrying the same information, introducing a timing delay between the two paths 235. In some cases, without a timing alignment, the UE 215 may not co-phase beams from multiple TRPs 206 (e.g., by use of the co-phasing factor alone).

In some examples, a TRP 206 may configure a composite beam 240 (e.g., a dynamic beam) to improve a communications reliability or rate with the UE 215. The composite beam 240 may include one or more TRP beams 220. The composite beam 240 may have a greater likelihood of detection and improved communication rates compared to an individual TRP beam 220. For example, a composite beam 240 that includes a set of TRP beams 220 may be detected by the UE 215, even if interference or path loss prevents detection of an individual TRP beam 220 (e.g., a TRP beam 220-a). In some cases, the UE 115-a may receive downlink transmissions from multiple TRPs 206, where two or more TRPs 206 (or relay nodes, sidelink UEs, repeaters) may send the same information to the UE 115-*a* from different directions using cooperative beamforming.

In some cases, the UE 215 may declare capability fields (e.g., of the UE 215) in terms of the quality of cluster delay spread estimation (e.g., high quality vs. low quality, or with more granularity) to enable timing alignment and quality of co-phasing factor estimation (e.g., high vs. low, or with more granularity) to enable coherent processing of transmissions from multiple TRPs 206. In some cases, the UE may declare separate capability fields (e.g., one field for the UE's delay spread estimation capability, and another field for the UE's co-phasing factor estimation capability) with respective granularities of $B_1$ and $B_2$ bits, or a joint capability field with a granularity of B bits, where $B_1$, $B_2$, and B may each represent a quantity of bits in the capability field and in some cases may be configured by a base station either autonomously or based on a recommendation transmitted from at least one UE 115 to at least one TRP 205. In some cases, $B_1=B_2=1$ bit. In some cases, a greater quantity of bits included in a field may enable indications of a finer granularity via the capability field. In some cases, the UE 215 may indicate the capability fields to one or more TRPs 206 (e.g., or base stations) in the wireless communications system 200.

In some examples, if the delay spread estimation capability and the co-phasing factor estimation capability declared by the UE 215 indicate good quality estimation, the base station may determine a specific TRP 206 (e.g., the TRP 206-*a*) as a reference TRP 206, and may inform the UE 215 to report a relative timing alignment factor with respect to the reference TRP 206 (e.g., a timing alignment factor indicative of a difference in arrival times for respective signaling from the reference TRP 206 and the other TRP 206). Additionally or alternatively, the base station may inform the UE 215 to report a respective absolute timing alignment factor for each TRP 206 (e.g., a timing factor indicative of an absolute time of arrival for signaling received from the associated TRP 206). Based on the reported timing alignment factors, the base station may adjust transmission times at the TRPs 206, or one or more of the TRPs 206 may adjust its own transmission times, which may allow the same symbols transmitted via different TRP beams 220 to arrive at the UE 215 at the same time or otherwise with timings that support improved reception by the UE 215 (e.g., improved coherent combining of signals associated with the different TRP beams 220 by the UE 215). For example, the UE 215 may determine the time between when a symbol leaves a TRP 206 and when it reaches the UE 215 (e.g., the transmit time), and therefore may determine and report the absolute time between the symbol being transmitted and arriving at the UE 215. In some cases, the TRPs 206 may transmit CSI-RSs to the UE 215, and the UE 215 may determine timing alignment factors based on the CSI-RSs.

In some cases, based on a request from the base station, the UE 215 may report, to the TRPs 206, timing alignment factors for co-phasing signals sent along different TRP beams 220 from the multiple TRPs 206. The request may indicate the multiple TRPs 206 associated with the timing alignment factors to be reported, a reference TRP for the timing alignment factors to be reported, or both. Or in some cases, the UE 215 may request to perform timing alignment adjustment for one or more TRPs 206. Whether in connection with a request from the base station or a request transmitted by the UE 25, the UE 215 may indicate the multiple TRPs 206 associated with the timing alignment factors to be reported, a reference TRP for the timing alignment factors to be reported, or both.

In some cases, the UE 215 may indicate the relative timing alignment for the one or more dominant clusters of one or more TRPs 206 relative to the reference TRP 206 in their joint transmissions to the UE 215. In some cases, the UE 215 may indicate one or more absolute timing alignment factors for one or more TRPs 206 corresponding to the discrete delay of the different or dominant clusters in the channel to each reported TRP 206.

In some cases, based on feedback from the UE 215, the base station or the TRPs 206 may adjust the transmit timing factors for one or more TRPs 206 for downlink transmissions. In some cases, this may include a UE-assisted TRP transmission mode with timing alignment adjustment. Along with timing adjustments, a base station or a TRP 206 may determine which TRP beams 220 to use for communications with the UE 215 based on the timing alignment factors received from the UE 215.

In some cases, if the delay spread estimation capability declared by the UE 215 is low, or if the ability to estimate the co-phasing factor capability declared by the UE 215 is low (e.g., as indicated by the bit fields), the UE 215 may perform a diversity reception using a cyclic delay diversity (CDD) scheme (e.g., either with a small delay or a large delay variant of CDD). In some examples, the CDD may be implemented by applying a different phase delay (e.g., a cyclic phase delay) to each transmission. For example, the UE 215 may perform a cyclic shift in the time domain on a TRP beam 220 transmitted by a TRP 206. Using the CDD scheme, the UE 215 may cycle through the delay domain and effectively average out the delays, some of which may be similar or varied. Because the UE 215 may not be able to estimate the timing delays accurately, the UE 215 may use random delays to implement the CDD scheme. For example, the UE 215 may quantize a 0° to 360° phase into 2 bits to create 4 levels (e.g., 0°, 90°, 180°, and 270°). The UE 215 may assign a first symbol to 0°, a second symbol to 90°, a third symbol to 180°, and a fourth symbol to 270°. As such, each symbol may have a phase offset with respect to the others. In some cases, the UE 215 may average these offsets together to determine which UE beam 225 to use for receiving the transmissions. In some cases, the UE 215 may use a smaller subset of phases depending on its capability. In some cases, the UE 215 may indicate specific time offsets (e.g., from a configured set of time offsets) to enable the CDD scheme. In some cases, if the UE's capability field is greater than 1 bit, the UE 215 may have an intermediate capability and the base station may determine whether the UE 215 may perform the reporting as described herein or use a CDD scheme.

Figure 3:
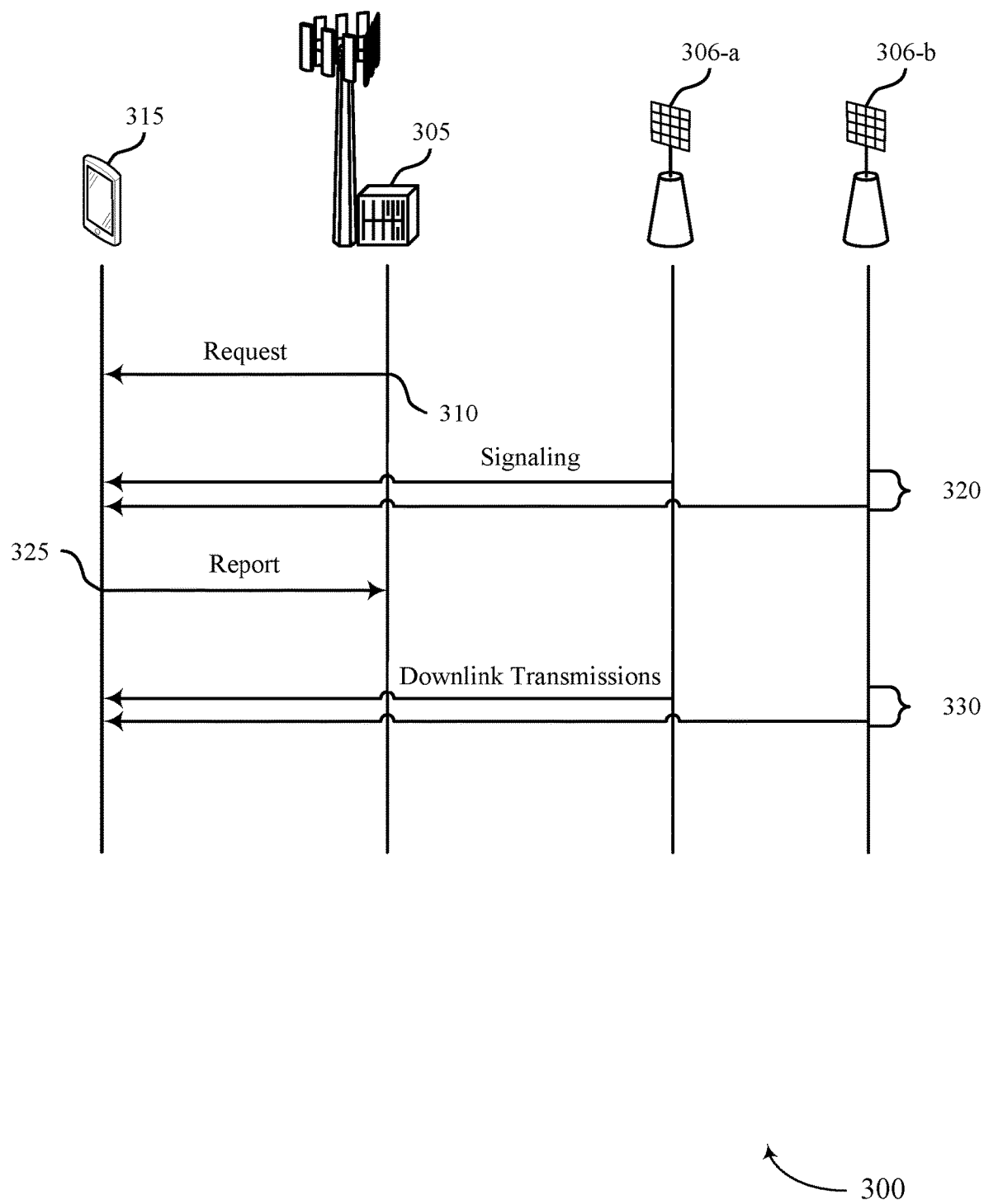
FIG. 3 illustrates an example of a process flow that supports timing adjustments for cooperative beamforming in accordance with aspects of the present disclosure.

FIG. 3 illustrates an example of a process flow 300 that supports timing adjustments for cooperative beamforming in accordance with aspects of the present disclosure. The process flow 300 may implement aspects of wireless communications systems 100 and 200, or may be implemented by aspects of the wireless communications system 100 and 200. For example, the process flow 300 may illustrate operations between a base station 305, a set of TRPs 306, and a UE 315, which may be examples of corresponding devices as described with reference to FIGS. 1 and 2. In the following description of the process flow 300, the operations between the base station 305, the TRPs 306, and the UE 315 may be transmitted in a different order than the example order shown, or the operations performed by the base station 305, the TRPs 306, and the UE 315 may be performed in different orders or at different times. Some operations may also be omitted from the process flow 300, and other operations may be added to the process flow 300. The TRPs 306 may be both be controlled by the base station 305, or may alternatively be controlled by separate base stations 305.

At 310, the UE 315 may receive, from the base station 305, a request for timing alignment information associated with the set of TRPs 306. In some cases, the UE 315 may transmit signaling indicating a capability associated with timing estimation for signals received from multiple TRPs 306. The capability may be associated with a quality of cluster delay spread estimation and a quality of co-phasing factor estimation at the UE 315.

At 320, the UE 315 may receive respective signaling from each TRP 306 of the set of TRPs 306. In some cases, the signaling may include a respective CSI-RS, a respective SSB, or both. In some cases, the UE 315 may identify a reference TRP 306 (e.g., a TRP 306-a) and determine a relative timing alignment factor between another TRP 306 (e.g., a TRP 306-b) and the reference TRP 306.

At 325, the UE 315 may transmit, based on receiving the request for timing alignment information, a report including one or more timing alignment factors for the set of TRPs 306. In some cases, the report may be based at least in part on the UE 315 receiving the respective signaling from each of the TRPs 306.

At 330, the UE 315 may receive a downlink transmission from the set of TRPs 306 according to a beamforming configuration based at least in part on the one or more timing alignment factors. In some cases, the UE 315 may receive a respective instance of the downlink transmission from each TRP 306 of the set of TRPs 306.

Figure 4:
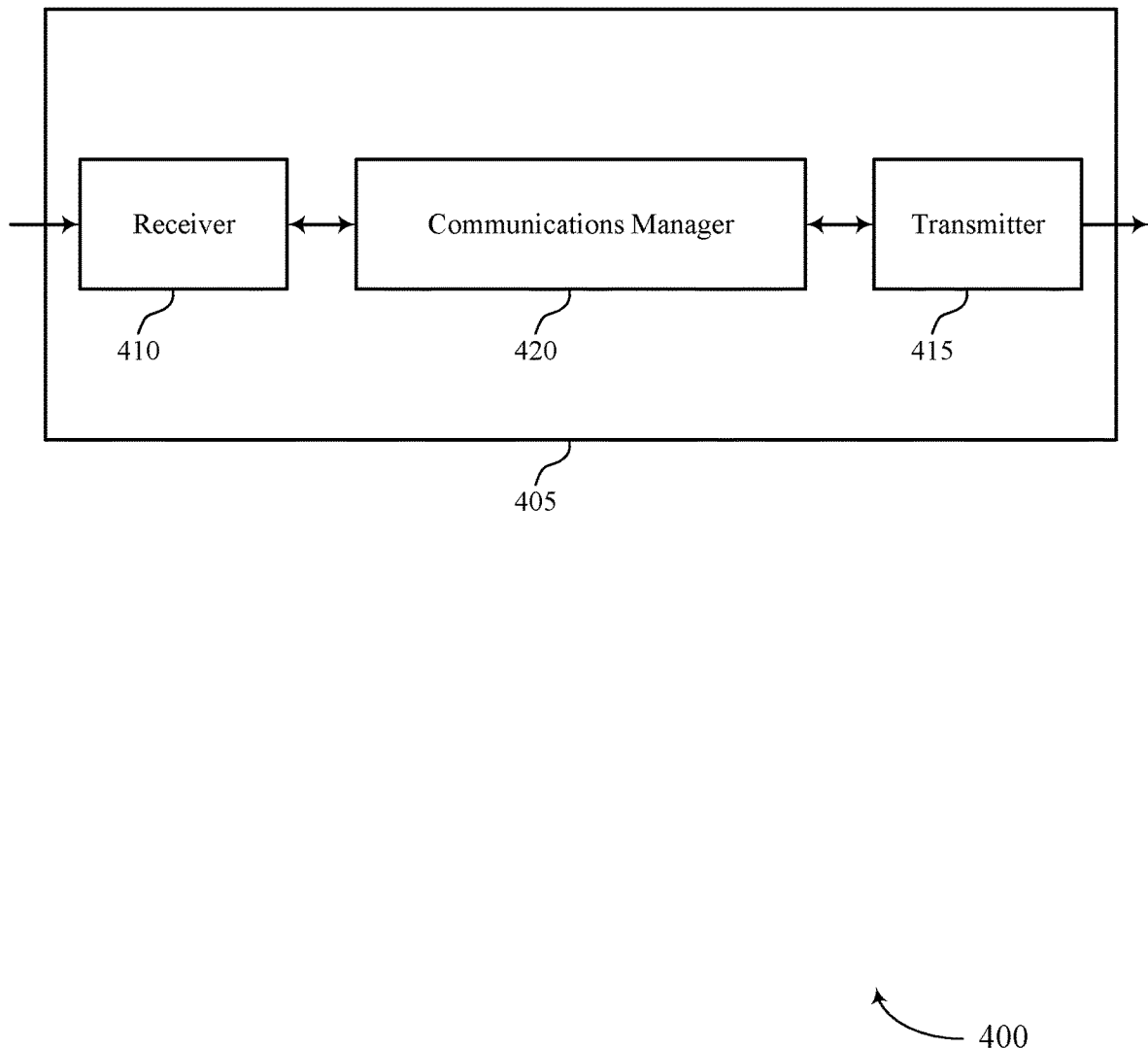
FIGS. 4 and 5 show block diagrams of devices that support timing adjustments for cooperative beamforming in accordance with aspects of the present disclosure.

FIG. 4 shows a block diagram 400 of a device 405 that supports timing adjustments for cooperative beamforming in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to timing adjustments for cooperative beamforming). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to timing adjustments for cooperative beamforming). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of timing adjustments for cooperative beamforming as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communications at a UE in accordance with examples as disclosed herein. For example, the communications manager 420 may be configured as or otherwise support a means for receiving, from a base station, a request for timing alignment information associated with a set of TRPs. The communications manager 420 may be configured as or otherwise support a means for transmitting, based on receiving the request, a report including one or more timing alignment factors for the set of TRPs. The communications manager 420 may be configured as or otherwise support a means for receiving a downlink transmission from the set of TRPs according to a beamforming configuration based on the one or more timing alignment factors, where receiving the downlink transmission according to the beamforming configuration includes receiving a respective instance of the downlink transmission from each TRP of the set of TRPs.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for timing adjustment in cooperative beamforming, which may improve resource efficiency, coordination between devices, and user experience, among other advantages. As such, supported techniques may include improved network operations and, in some examples, may promote network efficiencies, among other benefits.

Figure 5:
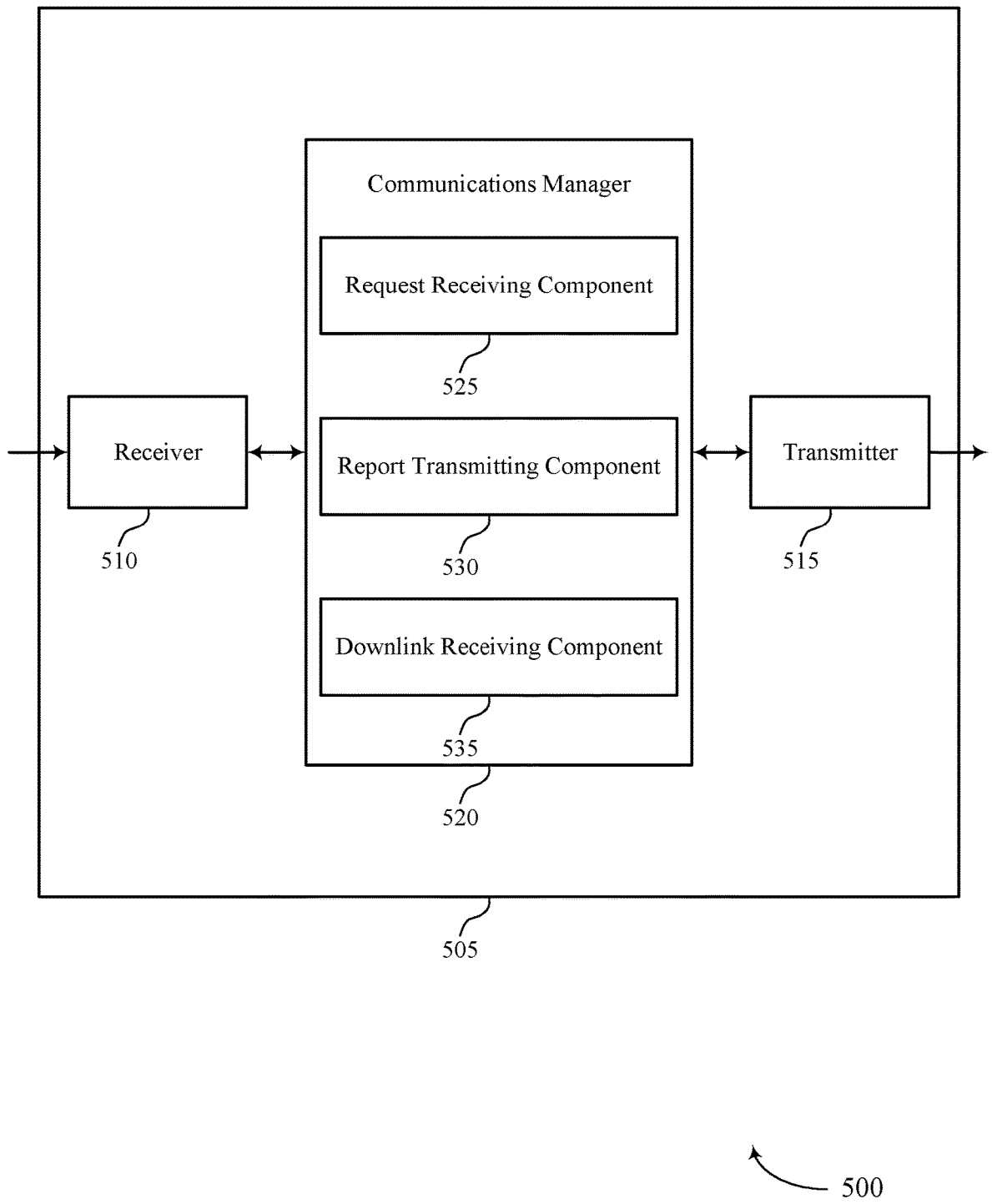

FIG. 5 shows a block diagram 500 of a device 505 that supports timing adjustments for cooperative beamforming in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to timing adjustments for cooperative beamforming). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to timing adjustments for cooperative beamforming). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of timing adjustments for cooperative beamforming as described herein. For example, the communications manager 520 may include a request receiving component 525, a report transmitting component 530, a downlink receiving component 535, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. The request receiving component 525 may be configured as or otherwise support a means for receiving, from a base station, a request for timing alignment information associated with a set of TRPs. The report transmitting component 530 may be configured as or otherwise support a means for transmitting, based on receiving the request, a report including one or more timing alignment factors for the set of TRPs. The downlink receiving component 535 may be configured as or otherwise support a means for receiving a downlink transmission from the set of TRPs according to a beamforming configuration based on the one or more timing alignment factors, where receiving the downlink transmission according to the beamforming configuration includes receiving a respective instance of the downlink transmission from each TRP of the set of TRPs.

Figure 6:
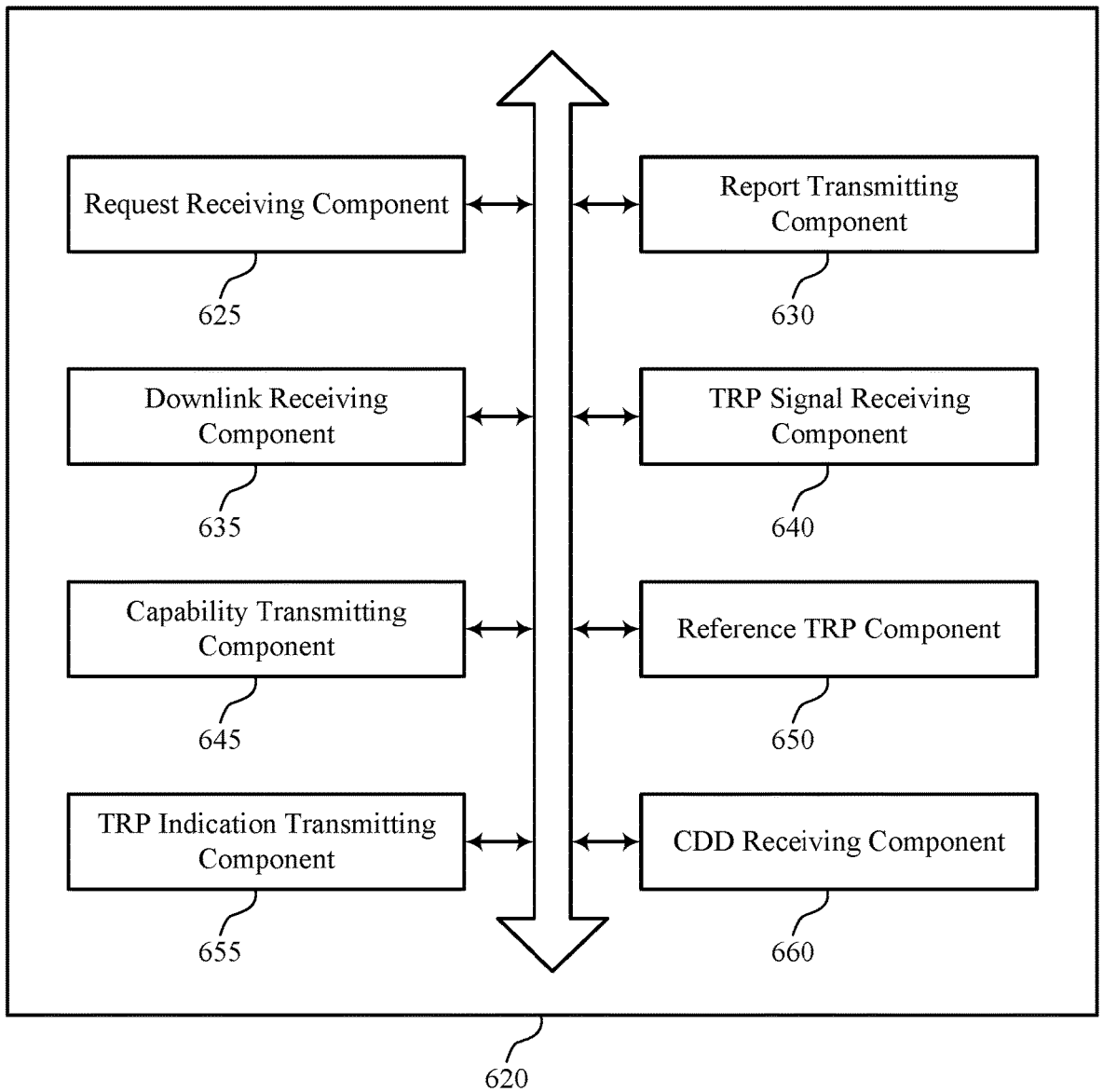
FIG. 6 shows a block diagram of a communications manager that supports timing adjustments for cooperative beamforming in accordance with aspects of the present disclosure.

FIG. 6 shows a block diagram 600 of a communications manager 620 that supports timing adjustments for cooperative beamforming in accordance with aspects of the present disclosure. The communications manager 620 may be an example of aspects of a communications manager 420, a communications manager 520, or both, as described herein. The communications manager 620, or various components thereof, may be an example of means for performing various aspects of timing adjustments for cooperative beamforming as described herein. For example, the communications manager 620 may include a request receiving component 625, a report transmitting component 630, a downlink receiving component 635, an TRP signal receiving component 640, a capability transmitting component 645, a reference TRP component 650, an TRP indication transmitting component 655, a CDD receiving component 660, or any combination thereof. Each of these components may communicate, directly or indirectly, with one another (e.g., via one or more buses).

The communications manager 620 may support wireless communications at a UE in accordance with examples as disclosed herein. The request receiving component 625 may be configured as or otherwise support a means for receiving, from a base station, a request for timing alignment information associated with a set of TRPs. The report transmitting component 630 may be configured as or otherwise support a means for transmitting, based on receiving the request, a report including one or more timing alignment factors for the set of TRPs. The downlink receiving component 635 may be configured as or otherwise support a means for receiving a downlink transmission from the set of TRPs according to a beamforming configuration based on the one or more timing alignment factors, where receiving the downlink transmission according to the beamforming configuration includes receiving a respective instance of the downlink transmission from each TRP of the set of TRPs.

In some examples, the TRP signal receiving component 640 may be configured as or otherwise support a means for receiving respective signaling from each TRP of the set of TRPs, where the report including the one or more timing alignment factors is transmitted based on the respective signaling.

In some examples, the respective signaling from each TRP includes a respective channel state information reference signal from each TRP, a respective synchronization signal block from each TRP, or both.

In some examples, the capability transmitting component 645 may be configured as or otherwise support a means for transmitting, to the base station, signaling indicating a capability associated with timing estimation for signals received from multiple TRPs, where the request for timing alignment information is received based on transmitting the signaling indicating the capability.

In some examples, the signaling indicating the capability includes one or more bit fields each associated with at least one of a quality of cluster delay spread estimation at the UE or a quality of co-phasing factor estimation at the UE.

In some examples, the reference TRP component 650 may be configured as or otherwise support a means for identifying a reference TRP of the set of TRPs based on receiving the request for timing alignment information. In some examples, the reference TRP component 650 may be configured as or otherwise support a means for comparing second signaling from a second TRP of the set of TRPs with first signaling from the reference TRP to determine a relative timing alignment factor for the second TRP, where the one or more timing alignment factors transmitted in the report include the relative timing alignment factor for the second TRP.

In some examples, the reference TRP component 650 may be configured as or otherwise support a means for transmitting, to the base station after identifying the reference TRP, signaling indicating the reference TRP.

In some examples, the TRP signal receiving component 640 may be configured as or otherwise support a means for receiving first signaling from a first TRP of the set of TRPs. In some examples, the TRP signal receiving component 640 may be configured as or otherwise support a means for receiving second signaling from a second TRP of the set of TRPs. In some examples, the TRP signal receiving component 640 may be configured as or otherwise support a means for determining a first timing alignment factor associated with the first TRP based on the first signaling and a second timing alignment factor associated with the second TRP based on the second signaling, where the second timing alignment factor is independent of the first timing alignment factor, and where the one or more timing alignment factors transmitted in the report include the first timing alignment factor and the second timing alignment factor.

In some examples, the TRP indication transmitting component 655 may be configured as or otherwise support a means for transmitting, to the base station, signaling indicating the set of TRPs for timing alignment, where the request for timing alignment information is received based on transmitting the signaling indicating the set of TRPs.

In some examples, to support receiving the downlink transmission according to the beamforming configuration, the CDD receiving component 660 may be configured as or otherwise support a means for receiving the respective instance of the downlink transmission from each TRP of the set of TRPs according to a CDD scheme.

In some examples, the CDD receiving component 660 may be configured as or otherwise support a means for determining one or more time offsets associated with the CDD scheme for the set of TRPs, where the one or more timing alignment factors transmitted in the report include the one or more time offsets.

In some examples, to support receiving the respective instance of the downlink transmission from each TRP according to the CDD scheme, the CDD receiving component 660 may be configured as or otherwise support a means for receiving a first instance of the downlink transmission from a first TRP of the set of TRPs based on a first time offset of the one or more time offsets associated with the CDD scheme. In some examples, to support receiving the respective instance of the downlink transmission from each TRP according to the CDD scheme, the CDD receiving component 660 may be configured as or otherwise support a means for receiving a second instance of the downlink transmission from a second TRP of the set of TRPs based on a second time offset of the one or more time offsets associated with the CDD scheme, where the second time offset is different from the first time offset.

Figure 7:
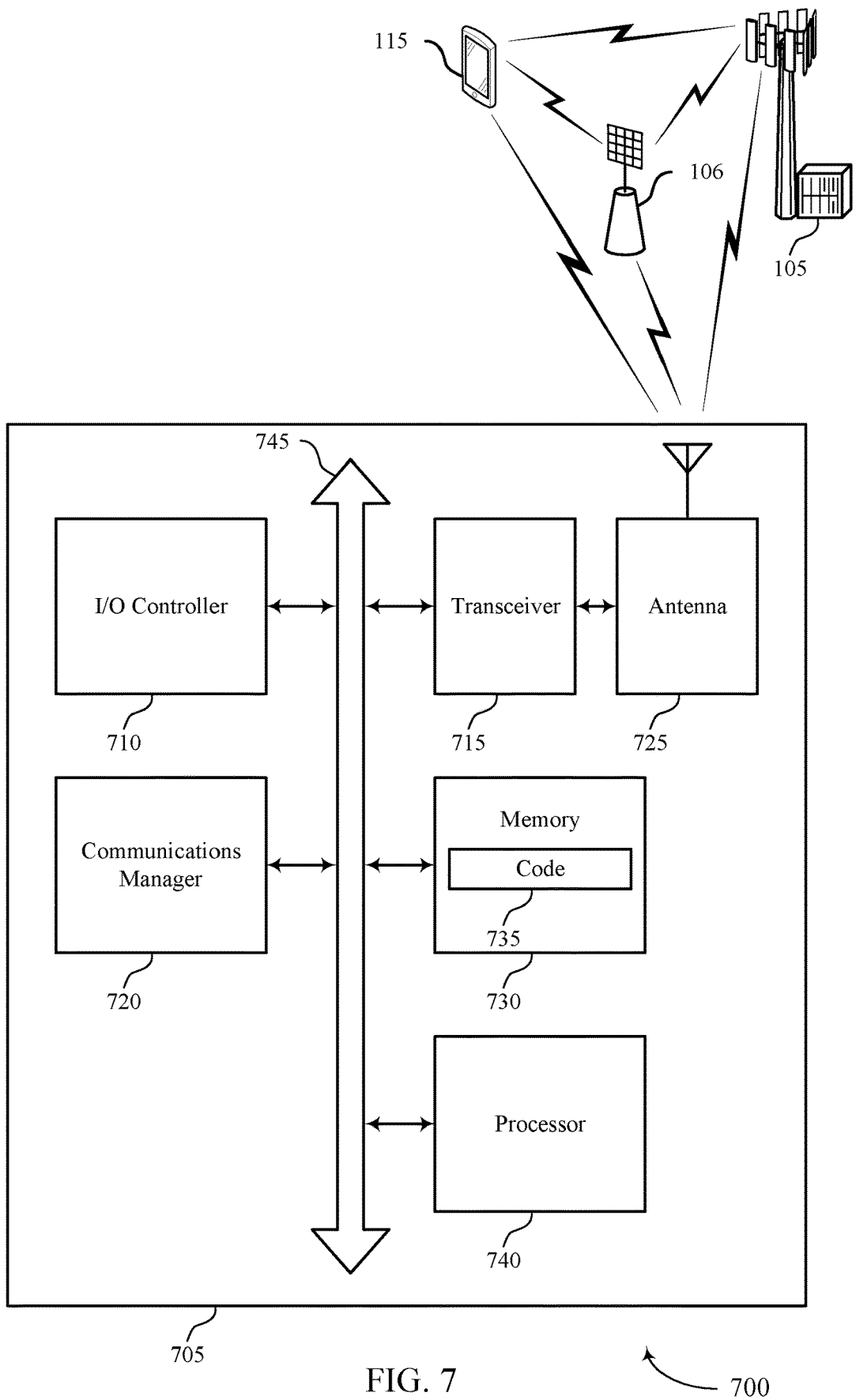
FIG. 7 shows a diagram of a system including a device that supports timing adjustments for cooperative beamforming in accordance with aspects of the present disclosure.

FIG. 7 shows a diagram of a system 700 including a device 705 that supports timing adjustments for cooperative beamforming in accordance with aspects of the present disclosure. The device 705 may be an example of or include the components of a device 405, a device 505, or a UE 115 as described herein. The device 705 may communicate wirelessly with one or more base stations 105, TRPs 106, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting timing adjustments for cooperative beamforming). For example, the device 705 or a component of the device 705 may include a processor 740 and memory 730 coupled to the processor 740, the processor 740 and memory 730 configured to perform various functions described herein.

The communications manager 720 may support wireless communications at a UE in accordance with examples as disclosed herein. For example, the communications manager 720 may be configured as or otherwise support a means for receiving, from a base station, a request for timing alignment information associated with a set of TRPs. The communications manager 720 may be configured as or otherwise support a means for transmitting, based on receiving the request, a report including one or more timing alignment factors for the set of TRPs. The communications manager 720 may be configured as or otherwise support a means for receiving a downlink transmission from the set of TRPs according to a beamforming configuration based on the one or more timing alignment factors, where receiving the downlink transmission according to the beamforming configuration includes receiving a respective instance of the downlink transmission from each TRP of the set of TRPs.

By including or configuring the communications manager 720 in accordance with examples as described herein, the device 705 may support timing adjustments for cooperative beamforming, which may improve resource efficiency, coordination between devices, and user experience, among other advantages. As such, supported techniques may include improved network operations and, in some examples, may promote network efficiencies, among other benefits.

In some examples, the communications manager 720 may be configured to perform various operations (e.g., receiving, monitoring, transmitting) using or otherwise in cooperation with the transceiver 715, the one or more antennas 725, or any combination thereof (e.g., the communications manager 720 may be configured to transmit or receive signals or messages described herein via the transceiver 715). Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of timing adjustments for cooperative beamforming as described herein, or the processor 740 and the memory 730 may be otherwise configured to perform or support such operations.

Figure 8:
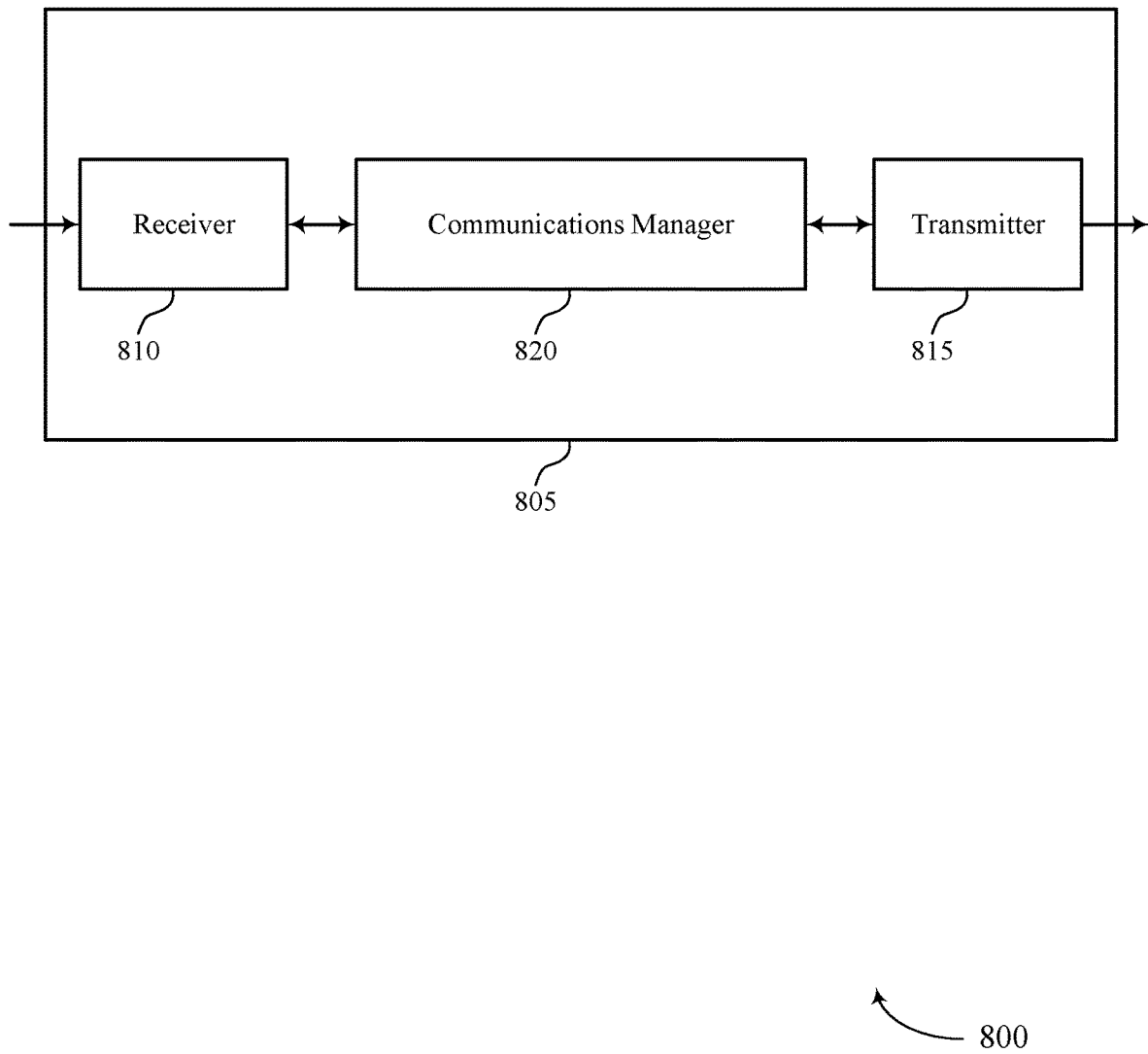
FIGS. 8 and 9 show block diagrams of devices that support timing adjustments for cooperative beamforming in accordance with aspects of the present disclosure.

FIG. 8 shows a block diagram 800 of a device 805 that supports timing adjustments for cooperative beamforming in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to timing adjustments for cooperative beamforming). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to timing adjustments for cooperative beamforming). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of timing adjustments for cooperative beamforming as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a base station in accordance with examples as disclosed herein. For example, the communications manager 820 may be configured as or otherwise support a means for transmitting, to a UE, a request for timing alignment information associated with a set of TRPs. The communications manager 820 may be configured as or otherwise support a means for receiving, based on transmitting the request, a report including one or more timing alignment factors for the set of TRPs. The communications manager 820 may be configured as or otherwise support a means for transmitting a downlink transmission using the set of TRPs according to a beamforming configuration based on the one or more timing alignment factors, where transmitting the downlink transmission according to the beamforming configuration includes transmitting a respective instance of the downlink transmission to the UE using each TRP of the set of TRPs.

By including or configuring the communications manager 820 in accordance with examples as described herein, the device 805 (e.g., a processor controlling or otherwise coupled to the receiver 810, the transmitter 815, the communications manager 820, or a combination thereof) may support timing adjustments for cooperative beamforming, which may improve resource efficiency, coordination between devices, and user experience, among other advantages. As such, supported techniques may include improved network operations and, in some examples, may promote network efficiencies, among other benefits.

Figure 9:
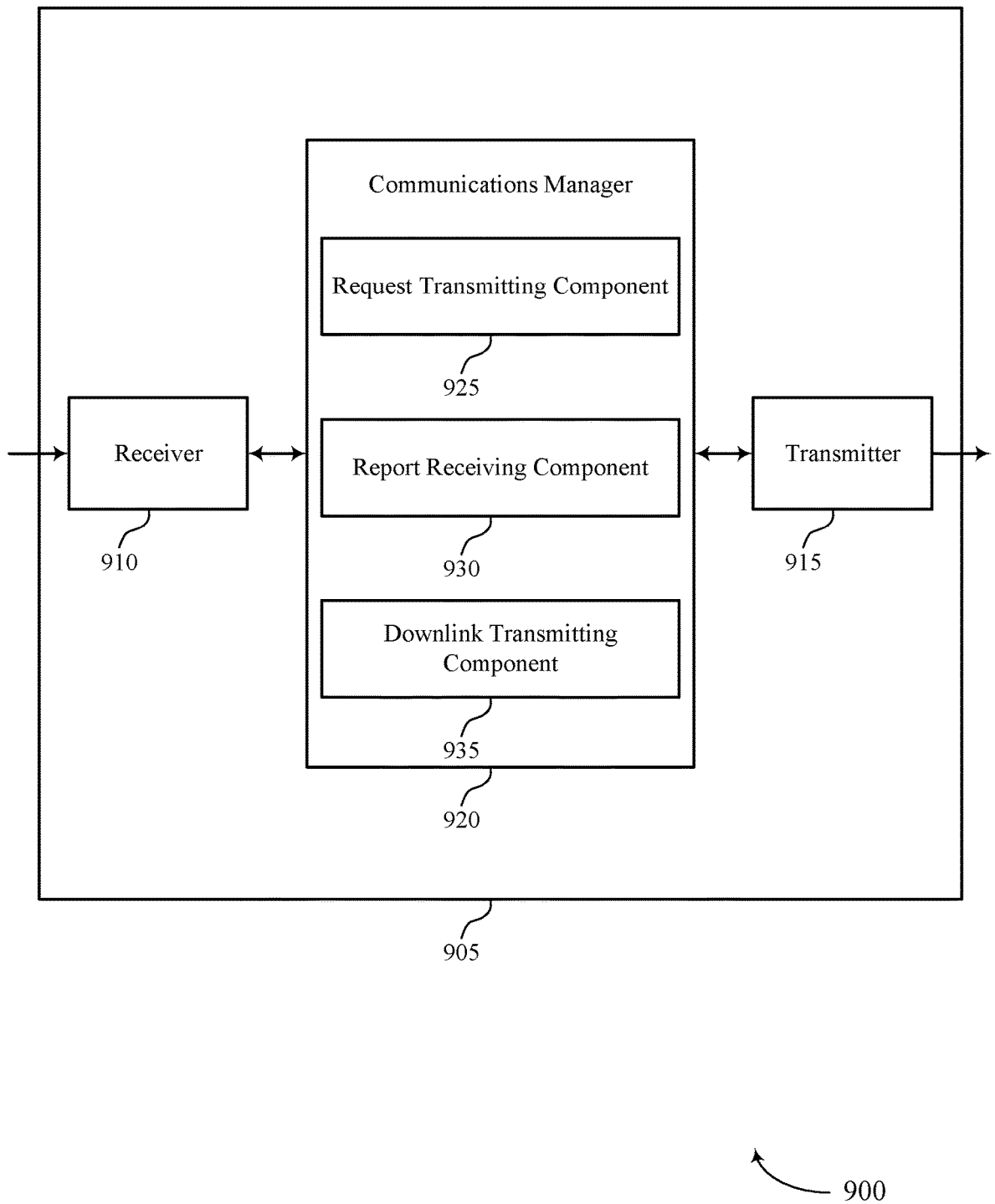

FIG. 9 shows a block diagram 900 of a device 905 that supports timing adjustments for cooperative beamforming in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to timing adjustments for cooperative beamforming). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to timing adjustments for cooperative beamforming). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of timing adjustments for cooperative beamforming as described herein. For example, the communications manager 920 may include a request transmitting component 925, a report receiving component 930, a downlink transmitting component 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. The request transmitting component 925 may be configured as or otherwise support a means for transmitting, to a UE, a request for timing alignment information associated with a set of TRPs. The report receiving component 930 may be configured as or otherwise support a means for receiving, based on transmitting the request, a report including one or more timing alignment factors for the set of TRPs. The downlink transmitting component 935 may be configured as or otherwise support a means for transmitting a downlink transmission using the set of TRPs according to a beamforming configuration based on the one or more timing alignment factors, where transmitting the downlink transmission according to the beamforming configuration includes transmitting a respective instance of the downlink transmission to the UE using each TRP of the set of TRPs.

Figure 10:
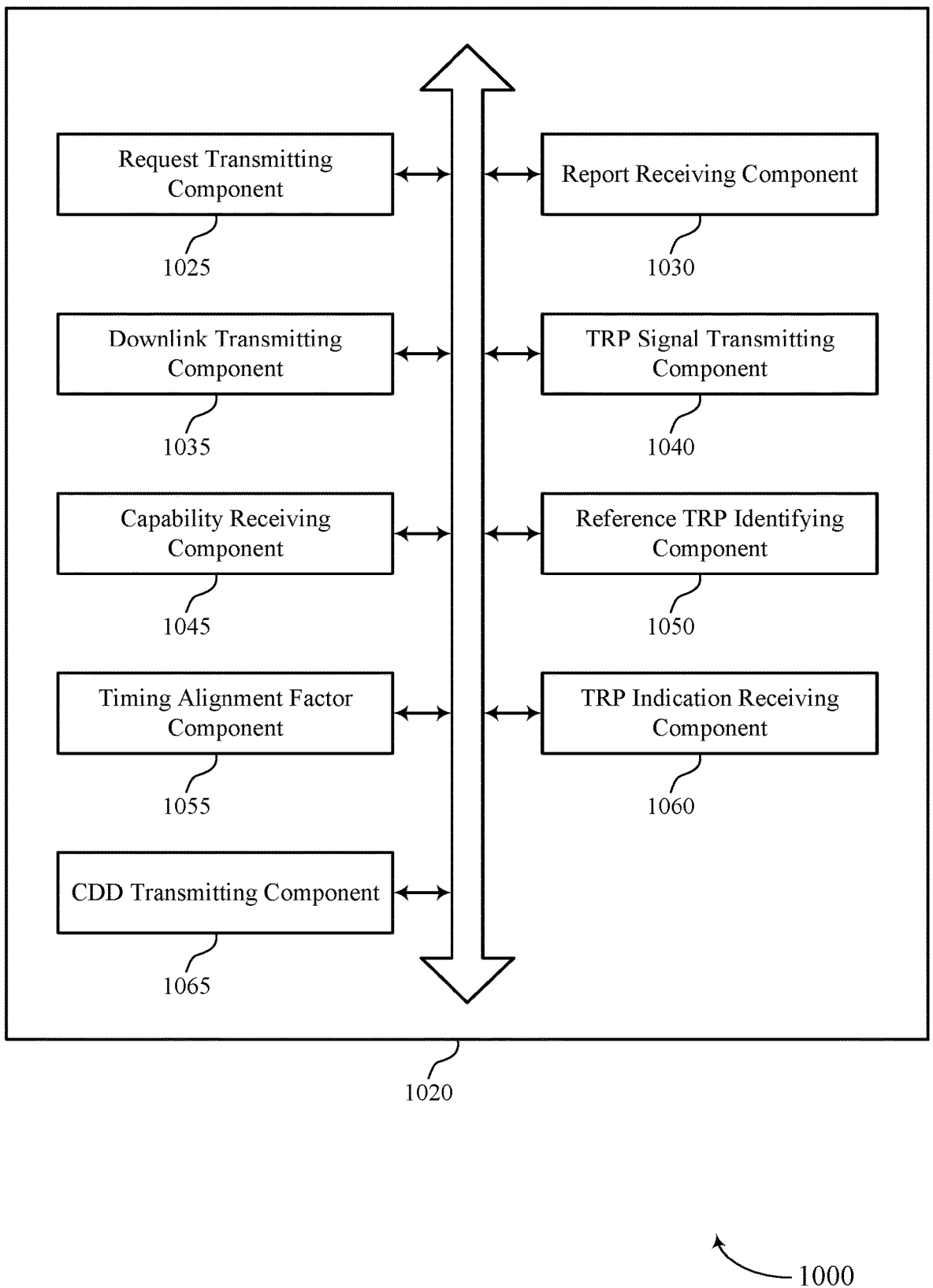
FIG. 10 shows a block diagram of a communications manager that supports timing adjustments for cooperative beamforming in accordance with aspects of the present disclosure.

FIG. 10 shows a block diagram 1000 of a communications manager 1020 that supports timing adjustments for cooperative beamforming in accordance with aspects of the present disclosure. The communications manager 1020 may be an example of aspects of a communications manager 820, a communications manager 920, or both, as described herein. The communications manager 1020, or various components thereof, may be an example of means for performing various aspects of timing adjustments for cooperative beamforming as described herein. For example, the communications manager 1020 may include a request transmitting component 1025, a report receiving component 1030, a downlink transmitting component 1035, an TRP signal transmitting component 1040, a capability receiving component 1045, a reference TRP identifying component 1050, a timing alignment factor component 1055, an TRP indication receiving component 1060, a CDD transmitting component 1065, or any combination thereof. Each of these components may communicate, directly or indirectly, with one another (e.g., via one or more buses).

The communications manager 1020 may support wireless communications at a base station in accordance with examples as disclosed herein. The request transmitting component 1025 may be configured as or otherwise support a means for transmitting, to a UE, a request for timing alignment information associated with a set of TRPs. The report receiving component 1030 may be configured as or otherwise support a means for receiving, based on transmitting the request, a report including one or more timing alignment factors for the set of TRPs. The downlink transmitting component 1035 may be configured as or otherwise support a means for transmitting a downlink transmission using the set of TRPs according to a beamforming configuration based on the one or more timing alignment factors, where transmitting the downlink transmission according to the beamforming configuration includes transmitting a respective instance of the downlink transmission to the UE using each TRP of the set of TRPs.

In some examples, the TRP signal transmitting component 1040 may be configured as or otherwise support a means for transmitting respective signaling using each TRP of the set of TRPs, where the report including the one or more timing alignment factors is received based on the respective signaling.

In some examples, the respective signaling transmitted using each TRP includes a respective channel state information reference signal from each TRP, a respective synchronization signal block from each TRP, or both.

In some examples, the capability receiving component 1045 may be configured as or otherwise support a means for receiving, from the UE, signaling indicating a capability associated with timing estimation for signals received at the UE from multiple TRPs, where the request for timing alignment information is transmitted based on receiving the signaling indicating the capability.

In some examples, the signaling indicating the capability includes one or more bit fields each associated with at least one of a quality of cluster delay spread estimation at the UE or a quality of co-phasing factor estimation at the UE.

In some examples, the reference TRP identifying component 1050 may be configured as or otherwise support a means for identifying a reference TRP of the set of TRPs, where the request for timing alignment information is transmitted based on determining the reference TRP. In some examples, the reference TRP identifying component 1050 may be configured as or otherwise support a means for identifying a relative timing alignment factor for a second TRP and associated with the reference TRP, where the one or more timing alignment factors received in the report include the relative timing alignment factor for the second TRP.

In some examples, the reference TRP identifying component 1050 may be configured as or otherwise support a means for receiving, from the UE before identifying the reference TRP, signaling indicating the reference TRP.

In some examples, the timing alignment factor component 1055 may be configured as or otherwise support a means for identifying a first timing alignment factor associated with a first TRP of the set of TRPs based on receiving the report. In some examples, the timing alignment factor component 1055 may be configured as or otherwise support a means for identifying a second timing alignment factor associated with a second TRP based on receiving the report, where the second timing alignment factor is independent of the first timing alignment factor, and where the one or more timing alignment factors received in the report include the first timing alignment factor and the second timing alignment factor. In some examples, the timing alignment factor component 1055 may be configured as or otherwise support a means for transmitting a first instance of the downlink transmission using the first TRP based on identifying the first timing alignment factor. In some examples, the timing alignment factor component 1055 may be configured as or otherwise support a means for transmitting a second instance of the downlink transmission using the second TRP based on identifying the second timing alignment factor, where transmitting the respective instance of the downlink transmission using each TRP of the set of TRPs includes transmitting the first instance of the downlink transmission using the first TRP and transmitting the second instance of the downlink transmission using the second TRP.

In some examples, the TRP indication receiving component 1060 may be configured as or otherwise support a means for receiving, from the UE, signaling indicating the set of TRPs for timing alignment, where the request for timing alignment information is transmitted based on receiving the signaling indicating the set of TRPs.

In some examples, to support transmitting the downlink transmission according to the beamforming configuration, the CDD transmitting component 1065 may be configured as or otherwise support a means for transmitting the respective instance of the downlink transmission using each TRP of the set of TRPs according to a CDD scheme.

In some examples, the one or more timing alignment factors received in the report include one or more time offsets associated with the CDD scheme for the set of TRPs.

In some examples, to support transmitting the respective instance of the downlink transmission using each TRP according to the CDD scheme, the CDD transmitting component 1065 may be configured as or otherwise support a means for transmitting a first instance of the downlink transmission using a first TRP of the set of TRPs based on a first time offset of the one or more time offsets associated with the CDD scheme. In some examples, to support transmitting the respective instance of the downlink transmission using each TRP according to the CDD scheme, the CDD transmitting component 1065 may be configured as or otherwise support a means for transmitting a second instance of the downlink transmission using a second TRP of the set of TRPs based on a second time offset of the one or more time offsets associated with the CDD scheme, where the second time offset is different from the first time offset.

Figure 11:
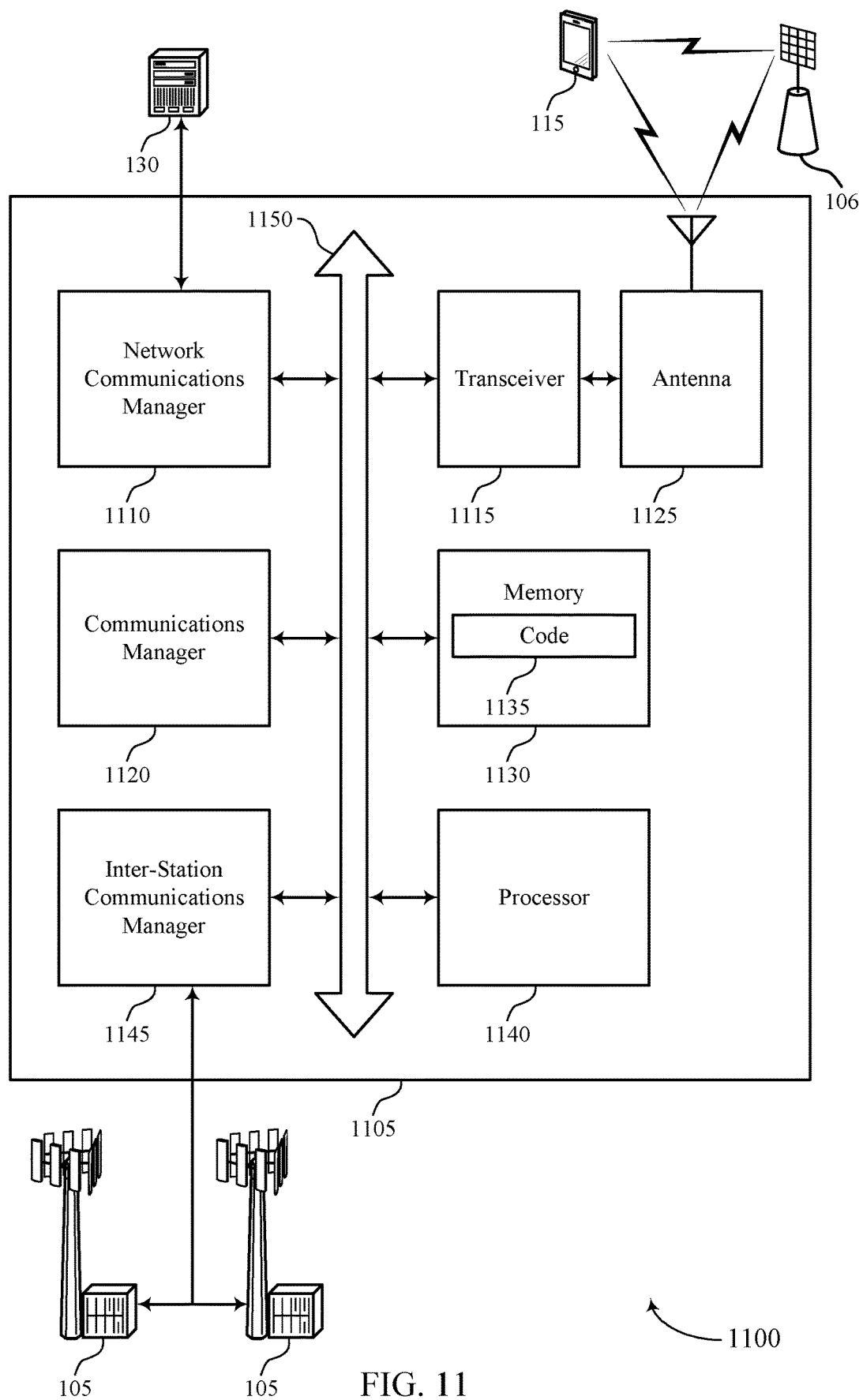
FIG. 11 shows a diagram of a system including a device that supports timing adjustments for cooperative beamforming in accordance with aspects of the present disclosure.

FIG. 11 shows a diagram of a system 1100 including a device 1105 that supports timing adjustments for cooperative beamforming in accordance with aspects of the present disclosure. The device 1105 may be an example of or include the components of a device 805, a device 905, or a base station 105 as described herein. The device 1105 may communicate wirelessly with one or more base stations 105, TRPs 106, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting timing adjustments for cooperative beamforming). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 or TRPs 106 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communications at a base station in accordance with examples as disclosed herein. For example, the communications manager 1120 may be configured as or otherwise support a means for transmitting, to a UE, a request for timing alignment information associated with a set of TRPs. The communications manager 1120 may be configured as or otherwise support a means for receiving, based on transmitting the request, a report including one or more timing alignment factors for the set of TRPs. The communications manager 1120 may be configured as or otherwise support a means for transmitting a downlink transmission using the set of TRPs according to a beamforming configuration based on the one or more timing alignment factors, where transmitting the downlink transmission according to the beamforming configuration includes transmitting a respective instance of the downlink transmission to the UE using each TRP of the set of TRPs.

By including or configuring the communications manager 1120 in accordance with examples as described herein, the device 1105 may support timing adjustments for cooperative beamforming, which may improve resource efficiency, coordination between devices, and user experience, among other advantages. As such, supported techniques may include improved network operations and, in some examples, may promote network efficiencies, among other benefits.

In some examples, the communications manager 1120 may be configured to perform various operations (e.g., receiving, monitoring, transmitting) using or otherwise in cooperation with the transceiver 1115, the one or more antennas 1125, or any combination thereof (e.g., the communications manager 1120 may be configured to transmit or receive signals or messages described herein via the transceiver 1115). Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of timing adjustments for cooperative beamforming as described herein, or the processor 1140 and the memory 1130 may be otherwise configured to perform or support such operations.

Figure 12:
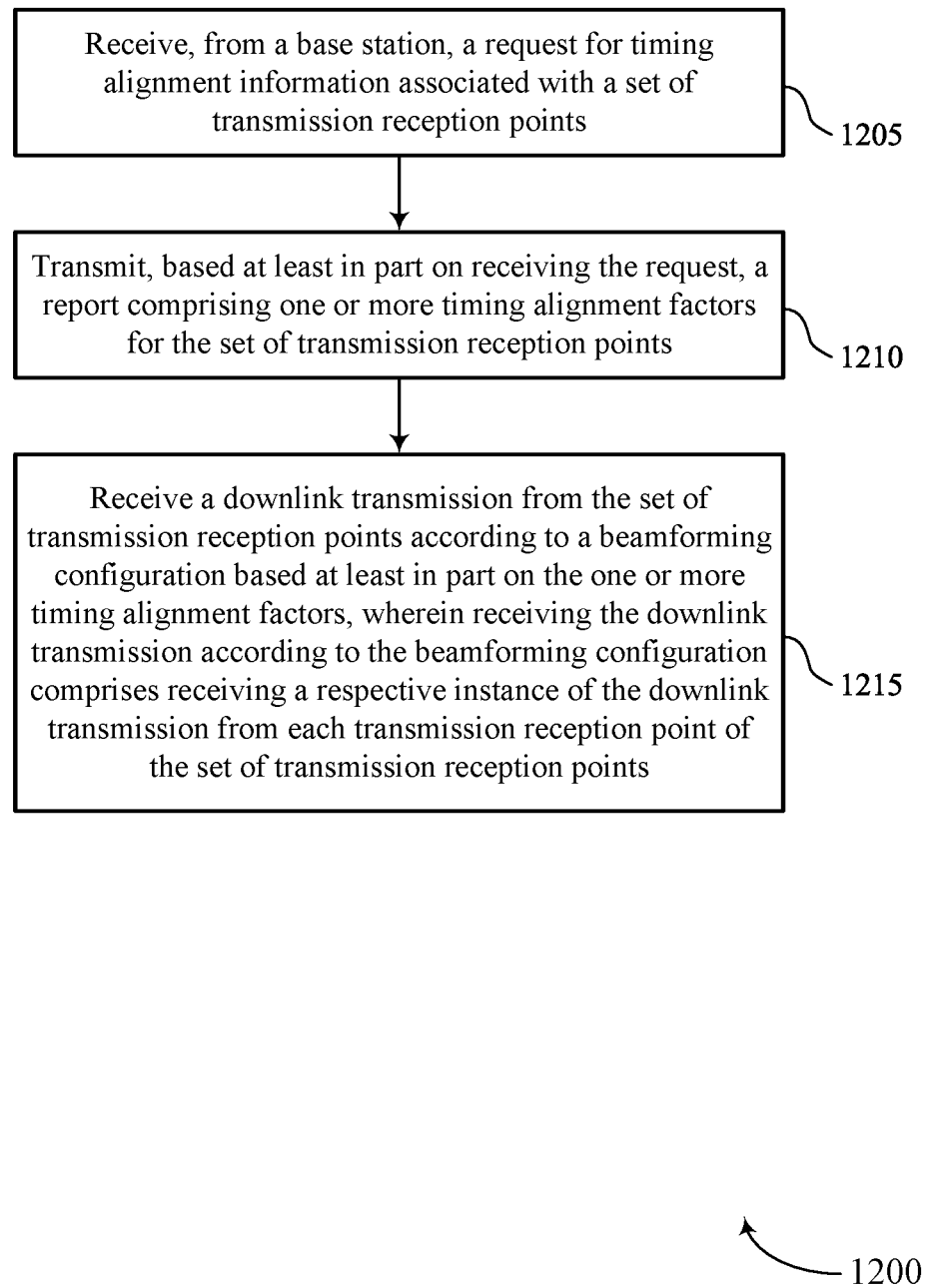
FIGS. 12 through 16 show flowcharts illustrating methods that support timing adjustments for cooperative beamforming in accordance with aspects of the present disclosure.

FIG. 12 shows a flowchart illustrating a method 1200 that supports timing adjustments for cooperative beamforming in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include receiving, from a base station, a request for timing alignment information associated with a set of TRPs. The operations of 1205 may be performed in accordance with examples as disclosed herein. In some examples, aspects of the operations of 1205 may be performed by a request receiving component 625 as described with reference to FIG. 6. Additionally or alternatively, means for performing 1205 may, but not necessarily, include, for example, antenna 725, transceiver 715, communications manager 720, memory 730 (including code 735), processor 740, or bus 745.

At 1210, the method may include transmitting, based on receiving the request, a report including one or more timing alignment factors for the set of TRPs. The operations of 1210 may be performed in accordance with examples as disclosed herein. In some examples, aspects of the operations of 1210 may be performed by a report transmitting component 630 as described with reference to FIG. 6. Additionally or alternatively, means for performing 1210 may, but not necessarily, include, for example, antenna 725, transceiver 715, communications manager 720, memory 730 (including code 735), processor 740, or bus 745.

At 1215, the method may include receiving a downlink transmission from the set of TRPs according to a beamforming configuration based on the one or more timing alignment factors, where receiving the downlink transmission according to the beamforming configuration includes receiving a respective instance of the downlink transmission from each TRP of the set of TRPs. The operations of 1215 may be performed in accordance with examples as disclosed herein. In some examples, aspects of the operations of 1215 may be performed by a downlink receiving component 635 as described with reference to FIG. 6. Additionally or alternatively, means for performing 1215 may, but not necessarily, include, for example, antenna 725, transceiver 715, communications manager 720, memory 730 (including code 735), processor 740, or bus 745.

Figure 13:
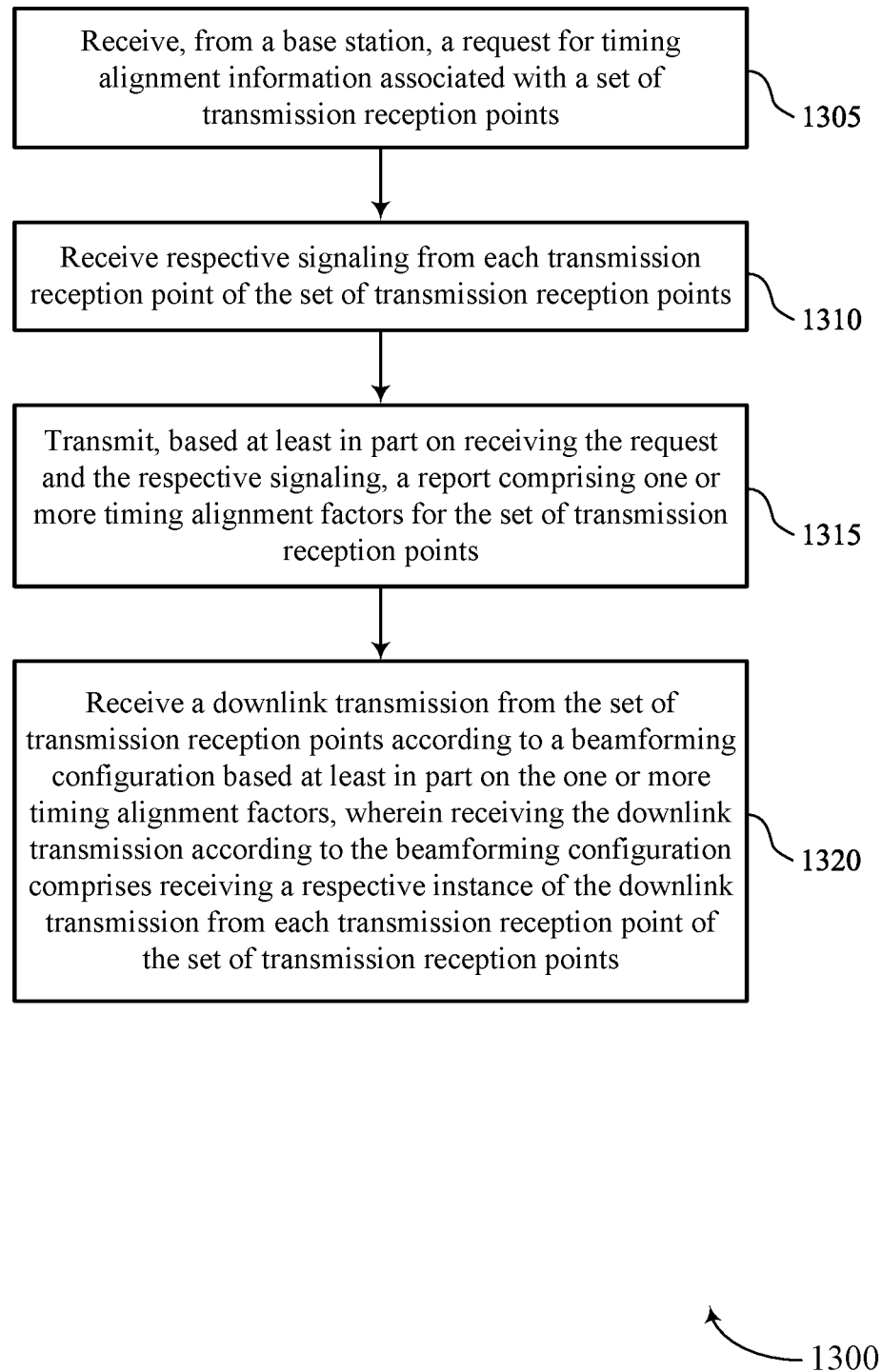

FIG. 13 shows a flowchart illustrating a method 1300 that supports timing adjustments for cooperative beamforming in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, a request for timing alignment information associated with a set of TRPs. The operations of 1305 may be performed in accordance with examples as disclosed herein. In some examples, aspects of the operations of 1305 may be performed by a request receiving component 625 as described with reference to FIG. 6. Additionally or alternatively, means for performing 1305 may, but not necessarily, include, for example, antenna 725, transceiver 715, communications manager 720, memory 730 (including code 735), processor 740, or bus 745.

At 1310, the method may include receiving respective signaling from each TRP of the set of TRPs. The operations of 1310 may be performed in accordance with examples as disclosed herein. In some examples, aspects of the operations of 1310 may be performed by an TRP signal receiving component 640 as described with reference to FIG. 6. Additionally or alternatively, means for performing 1310 may, but not necessarily, include, for example, antenna 725, transceiver 715, communications manager 720, memory 730 (including code 735), processor 740, or bus 745.

At 1315, the method may include transmitting, based on receiving the request and the respective signaling, a report including one or more timing alignment factors for the set of TRPs. The operations of 1315 may be performed in accordance with examples as disclosed herein. In some examples, aspects of the operations of 1315 may be performed by a report transmitting component 630 as described with reference to FIG. 6. Additionally or alternatively, means for performing 1315 may, but not necessarily, include, for example, antenna 725, transceiver 715, communications manager 720, memory 730 (including code 735), processor 740, or bus 745.

At 1320, the method may include receiving a downlink transmission from the set of TRPs according to a beamforming configuration based on the one or more timing alignment factors, where receiving the downlink transmission according to the beamforming configuration includes receiving a respective instance of the downlink transmission from each TRP of the set of TRPs. The operations of 1320 may be performed in accordance with examples as disclosed herein. In some examples, aspects of the operations of 1320 may be performed by a downlink receiving component 635 as described with reference to FIG. 6. Additionally or alternatively, means for performing 1320 may, but not necessarily, include, for example, antenna 725, transceiver 715, communications manager 720, memory 730 (including code 735), processor 740, or bus 745.

Figure 14:
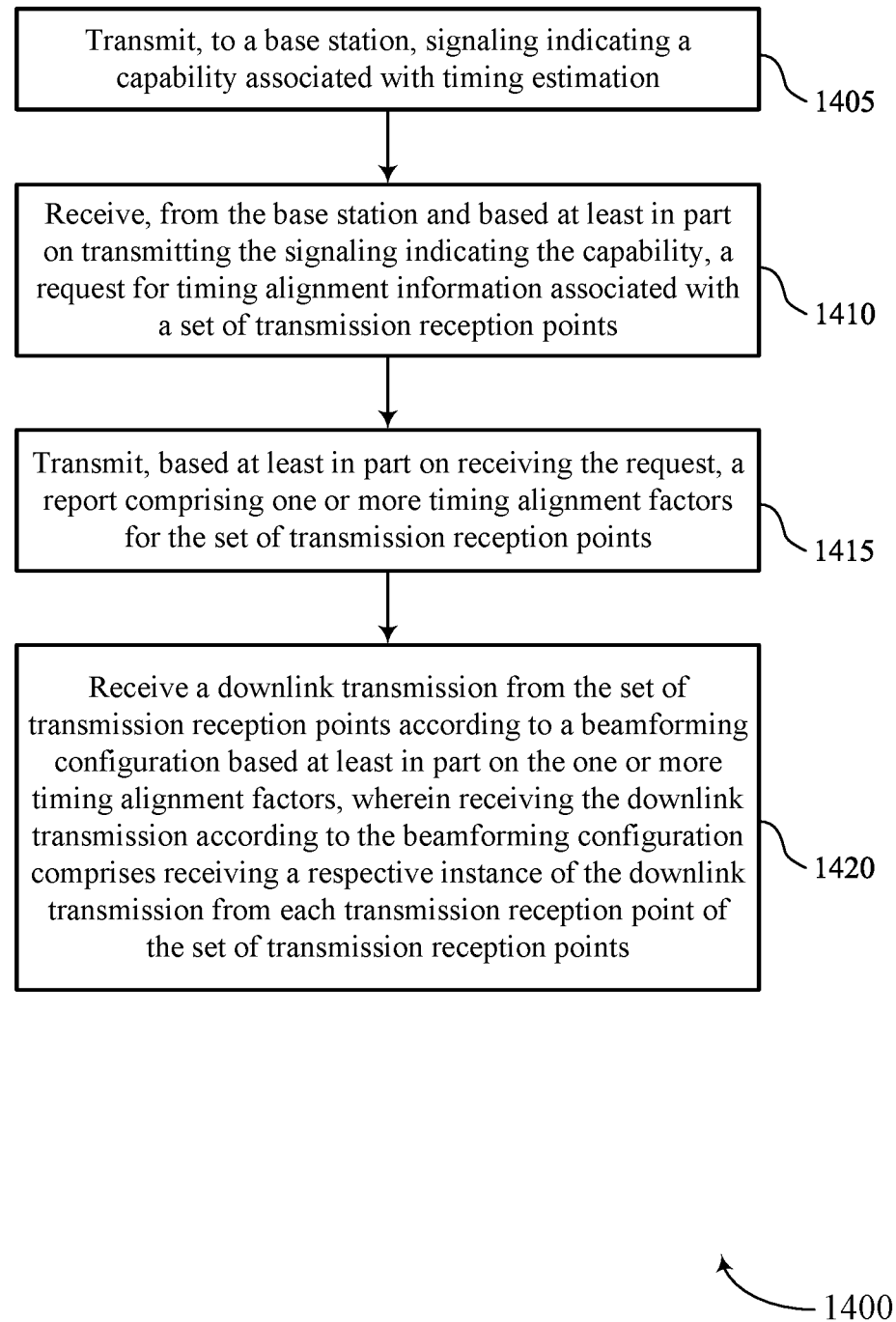

FIG. 14 shows a flowchart illustrating a method 1400 that supports timing adjustments for cooperative beamforming in accordance with aspects of the present disclosure. The operations of the method 1400 may be implemented by a UE or its components as described herein. For example, the operations of the method 1400 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1405, the method may include transmitting, to the base station, signaling indicating a capability associated with timing estimation for signals received from multiple TRPs. The operations of 1405 may be performed in accordance with examples as disclosed herein. In some examples, aspects of the operations of 1405 may be performed by a capability transmitting component 645 as described with reference to FIG. 6. Additionally or alternatively, means for performing 1405 may, but not necessarily, include, for example, antenna 725, transceiver 715, communications manager 720, memory 730 (including code 735), processor 740, or bus 745.

At 1410, the method may include receiving, from a base station and based on transmitting the signaling indicating the capability, a request for timing alignment information associated with a set of TRPs. The operations of 1410 may be performed in accordance with examples as disclosed herein. In some examples, aspects of the operations of 1410 may be performed by a request receiving component 625 as described with reference to FIG. 6. Additionally or alternatively, means for performing 1410 may, but not necessarily, include, for example, antenna 725, transceiver 715, communications manager 720, memory 730 (including code 735), processor 740, or bus 745.

At 1415, the method may include transmitting, based on receiving the request, a report including one or more timing alignment factors for the set of TRPs. The operations of 1415 may be performed in accordance with examples as disclosed herein. In some examples, aspects of the operations of 1415 may be performed by a report transmitting component 630 as described with reference to FIG. 6. Additionally or alternatively, means for performing 1415 may, but not necessarily, include, for example, antenna 725, transceiver 715, communications manager 720, memory 730 (including code 735), processor 740, or bus 745.

At 1420, the method may include receiving a downlink transmission from the set of TRPs according to a beamforming configuration based on the one or more timing alignment factors, where receiving the downlink transmission according to the beamforming configuration includes receiving a respective instance of the downlink transmission from each TRP of the set of TRPs. The operations of 1420 may be performed in accordance with examples as disclosed herein. In some examples, aspects of the operations of 1420 may be performed by a downlink receiving component 635 as described with reference to FIG. 6. Additionally or alternatively, means for performing 1420 may, but not necessarily, include, for example, antenna 725, transceiver 715, communications manager 720, memory 730 (including code 735), processor 740, or bus 745.

Figure 15:
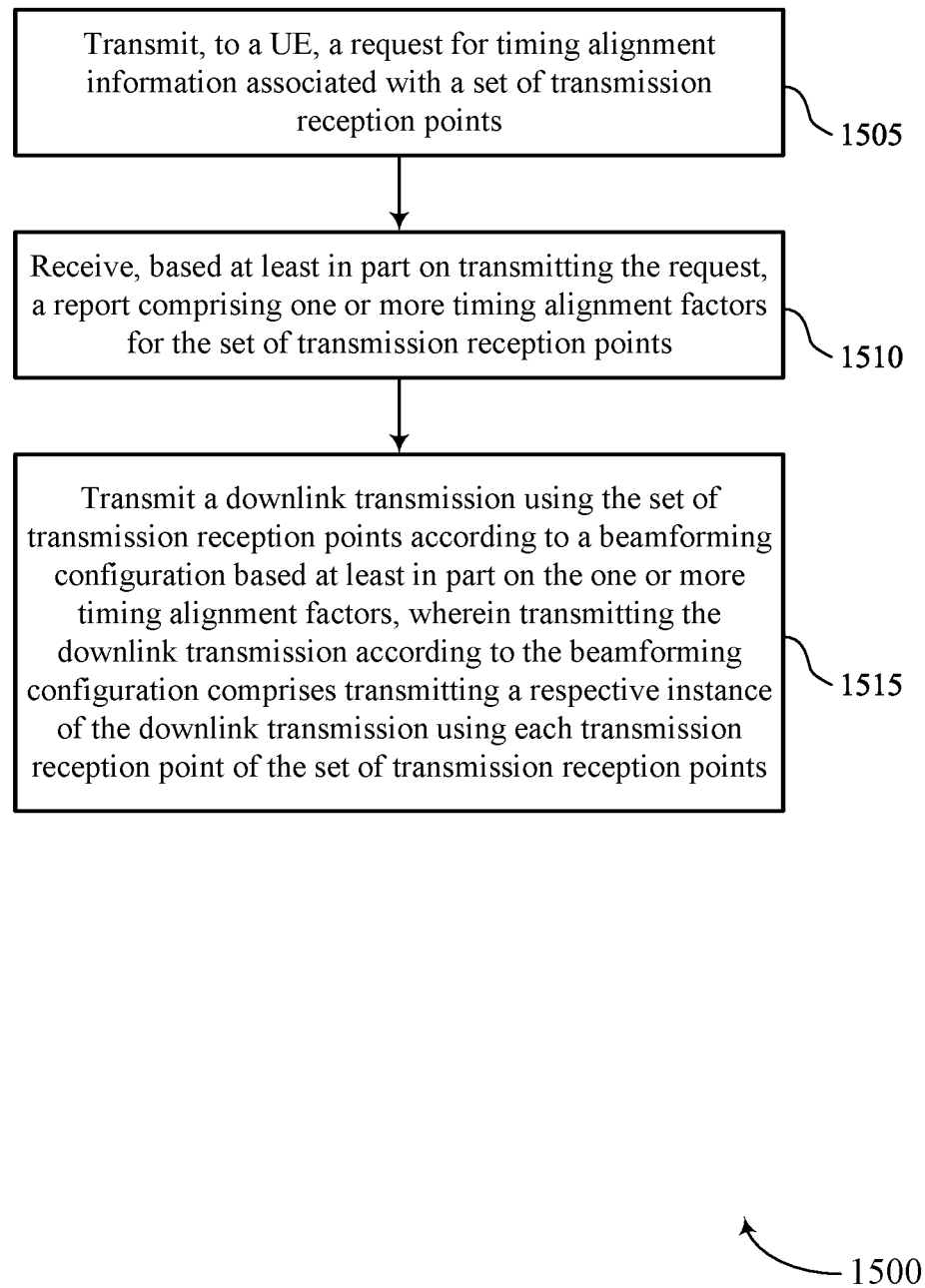

FIG. 15 shows a flowchart illustrating a method 1500 that supports timing adjustments for cooperative beamforming in accordance with aspects of the present disclosure. The operations of the method 1500 may be implemented by a base station or its components as described herein. For example, the operations of the method 1500 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1505, the method may include transmitting, to a UE, a request for timing alignment information associated with a set of TRPs. The operations of 1505 may be performed in accordance with examples as disclosed herein. In some examples, aspects of the operations of 1505 may be performed by a request transmitting component 1025 as described with reference to FIG. 10. Additionally or alternatively, means for performing 1505 may, but not necessarily, include, for example, antenna 1125, transceiver 1115, communications manager 1120, memory 1130 (including code 1135), processor 1140, inter-station communications manager 1145, or bus 1150.

At 1510, the method may include receiving, based on transmitting the request, a report including one or more timing alignment factors for the set of TRPs. The operations of 1510 may be performed in accordance with examples as disclosed herein. In some examples, aspects of the operations of 1510 may be performed by a report receiving component 1030 as described with reference to FIG. 10. Additionally or alternatively, means for performing 1510 may, but not necessarily, include, for example, antenna 1125, transceiver 1115, communications manager 1120, memory 1130 (including code 1135), processor 1140, inter-station communications manager 1145, or bus 1150.

At 1515, the method may include transmitting a downlink transmission using the set of TRPs according to a beamforming configuration based on the one or more timing alignment factors, where transmitting the downlink transmission according to the beamforming configuration includes transmitting a respective instance of the downlink transmission to the UE using each TRP of the set of TRPs. The operations of 1515 may be performed in accordance with examples as disclosed herein. In some examples, aspects of the operations of 1515 may be performed by a downlink transmitting component 1035 as described with reference to FIG. 10. Additionally or alternatively, means for performing 1515 may, but not necessarily, include, for example, antenna 1125, transceiver 1115, communications manager 1120, memory 1130 (including code 1135), processor 1140, inter-station communications manager 1145, or bus 1150.

Figure 16:
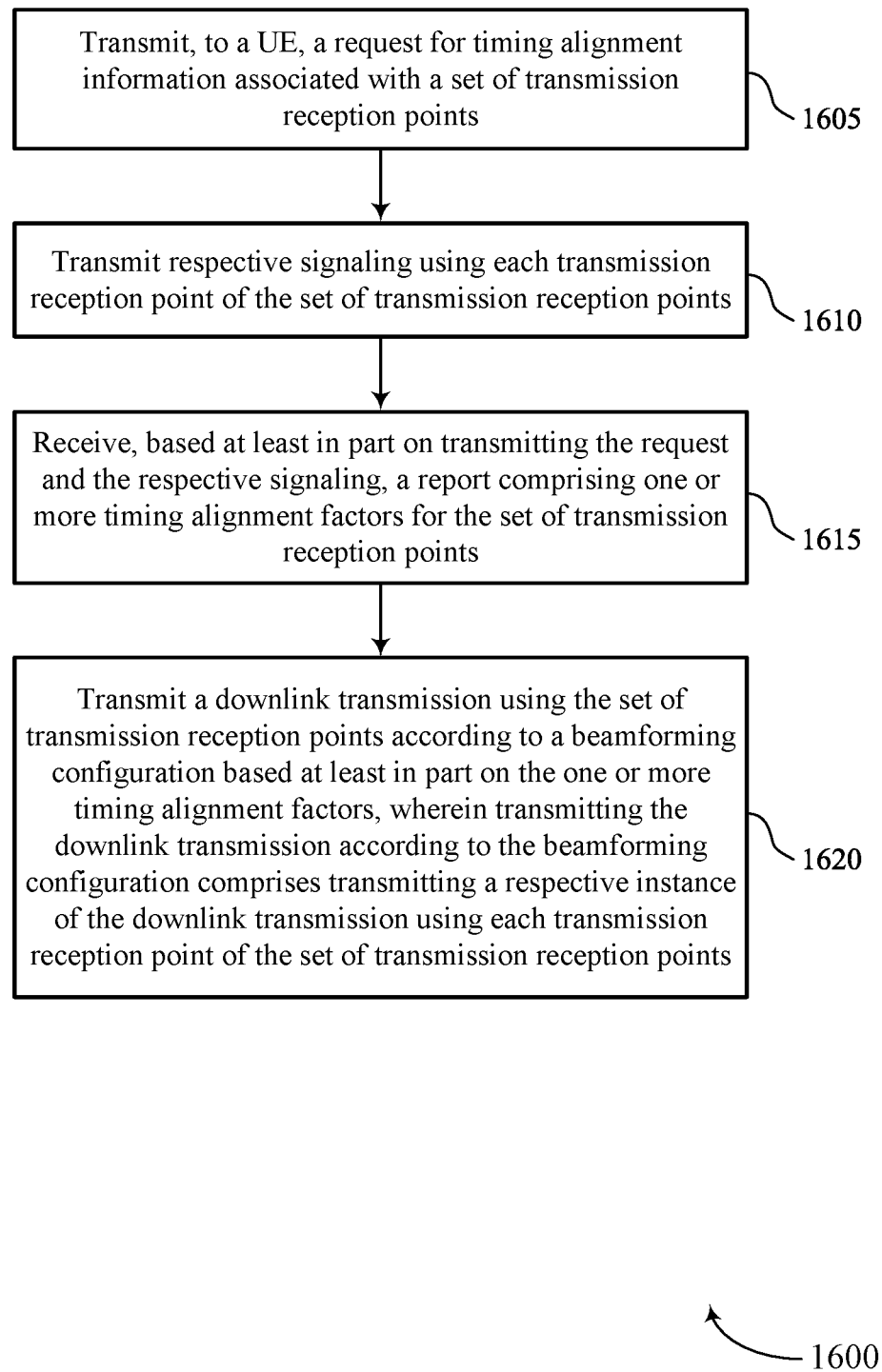

FIG. 16 shows a flowchart illustrating a method 1600 that supports timing adjustments for cooperative beamforming in accordance with aspects of the present disclosure. The operations of the method 1600 may be implemented by a base station or its components as described herein. For example, the operations of the method 1600 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1605, the method may include transmitting, to a UE, a request for timing alignment information associated with a set of TRPs. The operations of 1605 may be performed in accordance with examples as disclosed herein. In some examples, aspects of the operations of 1605 may be performed by a request transmitting component 1025 as described with reference to FIG. 10. Additionally or alternatively, means for performing 1605 may, but not necessarily, include, for example, antenna 1125, transceiver 1115, communications manager 1120, memory 1130 (including code 1135), processor 1140, inter-station communications manager 1145, or bus 1150.

At 1610, the method may include transmitting respective signaling using each TRP of the set of TRPs. The operations of 1610 may be performed in accordance with examples as disclosed herein. In some examples, aspects of the operations of 1610 may be performed by an TRP signal transmitting component 1040 as described with reference to FIG. 10. Additionally or alternatively, means for performing 1610 may, but not necessarily, include, for example, antenna 1125, transceiver 1115, communications manager 1120, memory 1130 (including code 1135), processor 1140, inter-station communications manager 1145, or bus 1150.

At 1615, the method may include receiving, based on transmitting the request and transmitting the respective signaling, a report including one or more timing alignment factors for the set of TRPs. The operations of 1615 may be performed in accordance with examples as disclosed herein. In some examples, aspects of the operations of 1615 may be performed by a report receiving component 1030 as described with reference to FIG. 10. Additionally or alternatively, means for performing 1615 may, but not necessarily, include, for example, antenna 1125, transceiver 1115, communications manager 1120, memory 1130 (including code 1135), processor 1140, inter-station communications manager 1145, or bus 1150.

At 1620, the method may include transmitting a downlink transmission using the set of TRPs according to a beamforming configuration based on the one or more timing alignment factors, where transmitting the downlink transmission according to the beamforming configuration includes transmitting a respective instance of the downlink transmission to the UE using each TRP of the set of TRPs. The operations of 1620 may be performed in accordance with examples as disclosed herein. In some examples, aspects of the operations of 1620 may be performed by a downlink transmitting component 1035 as described with reference to FIG. 10. Additionally or alternatively, means for performing 1620 may, but not necessarily, include, for example, antenna 1125, transceiver 1115, communications manager 1120, memory 1130 (including code 1135), processor 1140, inter-station communications manager 1145, or bus 1150.

The following provides an overview of aspects of the present disclosure:

Aspect 1: A method for wireless communications at a UE, comprising: receiving, from a base station, a request for timing alignment information associated with a set of TRPs; transmitting, based at least in part on receiving the request, a report comprising one or more timing alignment factors for the set of TRPs; receiving a downlink transmission from the set of TRPs according to a beamforming configuration based at least in part on the one or more timing alignment factors, wherein receiving the downlink transmission according to the beamforming configuration comprises receiving a respective instance of the downlink transmission from each TRP of the set of TRPs.

Aspect 2: The method of aspect 1, further comprising: receiving respective signaling from each TRP of the set of TRPs, wherein the report comprising the one or more timing alignment factors is transmitted based at least in part on the respective signaling.

Aspect 3: The method of aspect 2, wherein the respective signaling from each TRP comprises a respective channel state information reference signal from each TRP, a respective synchronization signal block from each TRP, or both.

Aspect 4: The method of any of aspects 1 through 3, further comprising: transmitting, to the base station, signaling indicating a capability associated with timing estimation for signals received from multiple TRPs, wherein the request for timing alignment information is received based at least in part on transmitting the signaling indicating the capability.

Aspect 5: The method of aspect 4, wherein the signaling indicating the capability comprises one or more bit fields each associated with at least one of a quality of cluster delay spread estimation at the UE or a quality of co-phasing factor estimation at the UE.

Aspect 6: The method of any of aspects 1 through 5, further comprising: identifying a reference TRP of the set of TRPs based at least in part on receiving the request for timing alignment information; and comparing second signaling from a second TRP of the set of TRPs with first signaling from the reference TRP to determine a relative timing alignment factor for the second TRP, wherein the one or more timing alignment factors transmitted in the report comprise the relative timing alignment factor for the second TRP.

Aspect 7: The method of aspect 6, further comprising: transmitting, to the base station after identifying the reference TRP, signaling indicating the reference TRP.

Aspect 8: The method of any of aspects 1 through 7, further comprising: receiving first signaling from a first TRP of the set of TRPs; receiving second signaling from a second TRP of the set of TRPs; and determining a first timing alignment factor associated with the first TRP based at least in part on the first signaling and a second timing alignment factor associated with the second TRP based at least in part on the second signaling, wherein the second timing alignment factor is independent of the first timing alignment factor, and wherein the one or more timing alignment factors transmitted in the report comprise the first timing alignment factor and the second timing alignment factor.

Aspect 9: The method of any of aspects 1 through 8, further comprising: transmitting, to the base station, signaling indicating the set of TRPs for timing alignment, wherein the request for timing alignment information is received based at least in part on transmitting the signaling indicating the set of TRPs.

Aspect 10: The method of any of aspects 1 through 9, wherein receiving the downlink transmission according to the beamforming configuration further comprises: receiving the respective instance of the downlink transmission from each TRP of the set of TRPs according to a CDD scheme.

Aspect 11: The method of aspect 10, further comprising: determining one or more time offsets associated with the CDD scheme for the set of TRPs, wherein the one or more timing alignment factors transmitted in the report comprise the one or more time offsets.

Aspect 12: The method of aspect 11, wherein receiving the respective instance of the downlink transmission from each TRP according to the CDD scheme comprises: receiving a first instance of the downlink transmission from a first TRP of the set of TRPs based at least in part on a first time offset of the one or more time offsets associated with the CDD scheme; and receiving a second instance of the downlink transmission from a second TRP of the set of TRPs based at least in part on a second time offset of the one or more time offsets associated with the CDD scheme, wherein the second time offset is different from the first time offset.

Aspect 13: A method for wireless communications at a base station, comprising: transmitting, to a UE, a request for timing alignment information associated with a set of TRPs; receiving, based at least in part on transmitting the request, a report comprising one or more timing alignment factors for the set of TRPs; transmitting a downlink transmission using the set of TRPs according to a beamforming configuration based at least in part on the one or more timing alignment factors, wherein transmitting the downlink transmission according to the beamforming configuration comprises transmitting a respective instance of the downlink transmission to the UE using each TRP of the set of TRPs.

Aspect 14: The method of aspect 13, further comprising: transmitting respective signaling using each TRP of the set of TRPs, wherein the report comprising the one or more timing alignment factors is received based at least in part on the respective signaling.

Aspect 15: The method of aspect 14, wherein the respective signaling transmitted using each TRP comprises a respective channel state information reference signal from each TRP, a respective synchronization signal block from each TRP, or both.

Aspect 16: The method of any of aspects 13 through 15, further comprising: receiving, from the UE, signaling indicating a capability associated with timing estimation for signals received at the UE from multiple TRPs, wherein the request for timing alignment information is transmitted based at least in part on receiving the signaling indicating the capability.

Aspect 17: The method of aspect 16, wherein the signaling indicating the capability comprises one or more bit fields each associated with at least one of a quality of cluster delay spread estimation at the UE or a quality of co-phasing factor estimation at the UE.

Aspect 18: The method of any of aspects 13 through 17, further comprising: identifying a reference TRP of the set of TRPs, wherein the request for timing alignment information is transmitted based at least in part on determining the reference TRP; and identifying a relative timing alignment factor for a second TRP and associated with the reference TRP, wherein the one or more timing alignment factors received in the report comprise the relative timing alignment factor for the second TRP.

Aspect 19: The method of aspect 18, further comprising: receiving, from the UE before identifying the reference TRP, signaling indicating the reference TRP.

Aspect 20: The method of any of aspects 13 through 19, further comprising: identifying a first timing alignment factor associated with a first TRP of the set of TRPs based at least in part on receiving the report; identifying a second timing alignment factor associated with a second TRP based at least in part on receiving the report, wherein the second timing alignment factor is independent of the first timing alignment factor, and wherein the one or more timing alignment factors received in the report comprise the first timing alignment factor and the second timing alignment factor; transmitting a first instance of the downlink transmission using the first TRP based at least in part on identifying the first timing alignment factor; and transmitting a second instance of the downlink transmission using the second TRP based at least in part on identifying the second timing alignment factor, wherein transmitting the respective instance of the downlink transmission using each TRP of the set of TRPs comprises transmitting the first instance of the downlink transmission using the first TRP and transmitting the second instance of the downlink transmission using the second TRP.

Aspect 21: The method of any of aspects 13 through 20, further comprising: receiving, from the UE, signaling indicating the set of TRPs for timing alignment, wherein the request for timing alignment information is transmitted based at least in part on receiving the signaling indicating the set of TRPs.

Aspect 22: The method of any of aspects 13 through 21, wherein transmitting the downlink transmission according to the beamforming configuration further comprises: transmitting the respective instance of the downlink transmission using each TRP of the set of TRPs according to a CDD scheme.

Aspect 23: The method of aspect 22, wherein the one or more timing alignment factors received in the report comprise one or more time offsets associated with the CDD scheme for the set of TRPs.

Aspect 24: The method of aspect 23, wherein transmitting the respective instance of the downlink transmission using each TRP according to the CDD scheme comprises: transmitting a first instance of the downlink transmission using a first TRP of the set of TRPs based at least in part on a first time offset of the one or more time offsets associated with the CDD scheme; and transmitting a second instance of the downlink transmission using a second TRP of the set of TRPs based at least in part on a second time offset of the one or more time offsets associated with the CDD scheme, wherein the second time offset is different from the first time offset.

Aspect 25: An apparatus for wireless communications at a UE, comprising a processor at the UE; memory in electronic communication with the processor; and the memory and the processor configured to perform a method of any of aspects 1 through 12.

Aspect 26: An apparatus for wireless communications at a UE, comprising at least one means for performing a method of any of aspects 1 through 12.

Aspect 27: A non-transitory computer-readable medium storing code for wireless communications at a UE, the code comprising instructions executable by a processor to perform a method of any of aspects 1 through 12.

Aspect 28: An apparatus for wireless communications at a base station, comprising a processor at the base station; memory in electronic communication with the processor; and the memory and the processor configured to perform a method of any of aspects 13 through 24.

Aspect 29: An apparatus for wireless communications at a base station, comprising at least one means for performing a method of any of aspects 13 through 24.

Aspect 30: A non-transitory computer-readable medium storing code for wireless communications at a base station, the code comprising instructions executable by a processor to perform a method of any of aspects 13 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving, from a base station, a request for timing alignment information associated with a set of transmission reception points;
   transmitting, based at least in part on receiving the request, a report comprising one or more timing alignment factors for the set of transmission reception points, wherein the one or more timing alignment factors are associated with respective co-phasing signals for the set of transmission reception points; and
   receiving a downlink transmission from the set of transmission reception points according to a beamforming configuration based at least in part on the one or more timing alignment factors, wherein receiving the downlink transmission according to the beamforming configuration comprises receiving a respective instance of the downlink transmission from each transmission reception point of the set of transmission reception points.

2. The method of claim 1, further comprising:
   receiving respective signaling from each transmission reception point of the set of transmission reception points, wherein the report comprising the one or more timing alignment factors is transmitted based at least in part on the respective signaling.

3. The method of claim 2, wherein the respective signaling from each transmission reception point comprises a respective channel state information reference signal from each transmission reception point, a respective synchronization signal block from each transmission reception point, or both.

4. The method of claim 1, further comprising:
   transmitting, to the base station, signaling indicating a capability associated with timing estimation for signals received from multiple transmission reception points, wherein the request for the timing alignment information is received based at least in part on transmitting the signaling indicating the capability.

5. The method of claim 4, wherein the signaling indicating the capability comprises one or more bit fields each associated with at least one of a quality of cluster delay spread estimation at the UE or a quality of co-phasing factor estimation at the UE.

6. The method of claim 1, further comprising:
   identifying a reference transmission reception point of the set of transmission reception points based at least in part on receiving the request for the timing alignment information; and
   comparing second signaling from a second transmission reception point of the set of transmission reception points with first signaling from the reference transmission reception point to determine a relative timing alignment factor for the second transmission reception point, wherein the one or more timing alignment factors transmitted in the report comprise the relative timing alignment factor for the second transmission reception point.

7. The method of claim 6, further comprising:
   transmitting, to the base station after identifying the reference transmission reception point, signaling indicating the reference transmission reception point.

8. The method of claim 1, further comprising:
   receiving first signaling from a first transmission reception point of the set of transmission reception points;
   receiving second signaling from a second transmission reception point of the set of transmission reception points; and
   determining a first timing alignment factor associated with the first transmission reception point based at least in part on the first signaling and a second timing alignment factor associated with the second transmission reception point based at least in part on the second signaling, wherein the second timing alignment factor is independent of the first timing alignment factor, and wherein the one or more timing alignment factors transmitted in the report comprise the first timing alignment factor and the second timing alignment factor.

9. The method of claim 1, further comprising:
   transmitting, to the base station, signaling indicating the set of transmission reception points for timing alignment, wherein the request for the timing alignment information is received based at least in part on transmitting the signaling indicating the set of transmission reception points.

10. The method of claim 1, wherein receiving the downlink transmission according to the beamforming configuration further comprises:
receiving the respective instance of the downlink transmission from each transmission reception point of the set of transmission reception points according to a cyclic delay diversity scheme.

11. The method of claim 10, further comprising:
determining one or more time offsets associated with the cyclic delay diversity scheme for the set of transmission reception points, wherein the one or more timing alignment factors transmitted in the report comprise the one or more time offsets.

12. The method of claim 11, wherein receiving the respective instance of the downlink transmission from each transmission reception point according to the cyclic delay diversity scheme comprises:
receiving a first instance of the downlink transmission from a first transmission reception point of the set of transmission reception points based at least in part on a first time offset of the one or more time offsets associated with the cyclic delay diversity scheme; and
receiving a second instance of the downlink transmission from a second transmission reception point of the set of transmission reception points based at least in part on a second time offset of the one or more time offsets associated with the cyclic delay diversity scheme, wherein the second time offset is different from the first time offset.

13. A method for wireless communications at a base station, comprising:
transmitting, to a user equipment (UE), a request for timing alignment information associated with a set of transmission reception points;
receiving, based at least in part on transmitting the request, a report comprising one or more timing alignment factors for the set of transmission reception points, wherein the one or more timing alignment factors are associated with respective co-phasing signals for the set of transmission reception points; and
transmitting a downlink transmission using the set of transmission reception points according to a beamforming configuration based at least in part on the one or more timing alignment factors, wherein transmitting the downlink transmission according to the beamforming configuration comprises transmitting a respective instance of the downlink transmission to the UE using each transmission reception point of the set of transmission reception points.

14. The method of claim 13, further comprising:
transmitting respective signaling using each transmission reception point of the set of transmission reception points, wherein the report comprising the one or more timing alignment factors is received based at least in part on the respective signaling.

15. The method of claim 14, wherein the respective signaling transmitted using each transmission reception point comprises a respective channel state information reference signal from each transmission reception point, a respective synchronization signal block from each transmission reception point, or both.

16. The method of claim 13, further comprising:
receiving, from the UE, signaling indicating a capability associated with timing estimation for signals received at the UE from multiple transmission reception points, wherein the request for the timing alignment information is transmitted based at least in part on receiving the signaling indicating the capability.

17. The method of claim 16, wherein the signaling indicating the capability comprises one or more bit fields each associated with at least one of a quality of cluster delay spread estimation at the UE or a quality of co-phasing factor estimation at the UE.

18. The method of claim 13, further comprising:
identifying a reference transmission reception point of the set of transmission reception points, wherein the request for the timing alignment information is transmitted based at least in part on determining the reference transmission reception point; and
identifying a relative timing alignment factor for a second transmission reception point and associated with the reference transmission reception point, wherein the one or more timing alignment factors received in the report comprise the relative timing alignment factor for the second transmission reception point.

19. The method of claim 18, further comprising:
receiving, from the UE before identifying the reference transmission reception point, signaling indicating the reference transmission reception point.

20. The method of claim 13, further comprising:
identifying a first timing alignment factor associated with a first transmission reception point of the set of transmission reception points based at least in part on receiving the report;
identifying a second timing alignment factor associated with a second transmission reception point based at least in part on receiving the report, wherein the second timing alignment factor is independent of the first timing alignment factor, and wherein the one or more timing alignment factors received in the report comprise the first timing alignment factor and the second timing alignment factor;
transmitting a first instance of the downlink transmission using the first transmission reception point based at least in part on identifying the first timing alignment factor; and
transmitting a second instance of the downlink transmission using the second transmission reception point based at least in part on identifying the second timing alignment factor, wherein transmitting the respective instance of the downlink transmission using each transmission reception point of the set of transmission reception points comprises transmitting the first instance of the downlink transmission using the first transmission reception point and transmitting the second instance of the downlink transmission using the second transmission reception point.

21. The method of claim 13, further comprising:
receiving, from the UE, signaling indicating the set of transmission reception points for timing alignment, wherein the request for the timing alignment information is transmitted based at least in part on receiving the signaling indicating the set of transmission reception points.

22. The method of claim 13, wherein transmitting the downlink transmission according to the beamforming configuration further comprises:
transmitting the respective instance of the downlink transmission using each transmission reception point of the set of transmission reception points according to a cyclic delay diversity scheme.

23. The method of claim 22, wherein the one or more timing alignment factors received in the report comprise one or more time offsets associated with the cyclic delay diversity scheme for the set of transmission reception points.

24. The method of claim 23, wherein transmitting the respective instance of the downlink transmission using each transmission reception point according to the cyclic delay diversity scheme comprises:
transmitting a first instance of the downlink transmission using a first transmission reception point of the set of transmission reception points based at least in part on a first time offset of the one or more time offsets associated with the cyclic delay diversity scheme; and
transmitting a second instance of the downlink transmission using a second transmission reception point of the set of transmission reception points based at least in part on a second time offset of the one or more time offsets associated with the cyclic delay diversity scheme, wherein the second time offset is different from the first time offset.

25. An apparatus for wireless communications, comprising:
at least one processor of a user equipment (UE); and
memory in electronic communication with the at least one processor, the memory and the at least one processor configured to cause the apparatus to:
receive, from a base station, a request for timing alignment information associated with a set of transmission reception points;
transmit, based at least in part on receiving the request, a report comprising one or more timing alignment factors for the set of transmission reception points, wherein the one or more timing alignment factors are associated with respective co-phasing signals for the set of transmission reception points; and
receive a downlink transmission from the set of transmission reception points according to a beamforming configuration based at least in part on the one or more timing alignment factors, wherein receiving the downlink transmission according to the beamforming configuration comprises receiving a respective instance of the downlink transmission from each transmission reception point of the set of transmission reception points.

26. The apparatus of claim 25, the memory and the at least one processor further configured to cause the apparatus to:
receive respective signaling from each transmission reception point of the set of transmission reception points, wherein the report comprising the one or more timing alignment factors is transmitted based at least in part on the respective signaling.

27. The apparatus of claim 25, the memory and the at least one processor further configured to cause the apparatus to:
transmit, to the base station, signaling indicating a capability associated with timing estimation for signals received from multiple transmission reception points, wherein the request for the timing alignment information is received based at least in part on transmitting the signaling indicating the capability.

28. An apparatus for wireless communications, comprising:
at least one processor of a base station; and
memory in electronic communication with the at least one processor, the memory and the at least one processor configured to cause the apparatus to:
transmit, to a user equipment (UE), a request for timing alignment information associated with a set of transmission reception points;
receive, based at least in part on transmitting the request, a report comprising one or more timing alignment factors for the set of transmission reception points, wherein the one or more timing alignment factors are associated with respective co-phasing signals for the set of transmission reception points; and
transmit a downlink transmission using the set of transmission reception points according to a beamforming configuration based at least in part on the one or more timing alignment factors, wherein transmitting the downlink transmission according to the beamforming configuration comprises transmitting a respective instance of the downlink transmission to the UE using each transmission reception point of the set of transmission reception points.

29. The apparatus of claim 28, the memory and the at least one processor further configured to cause the apparatus to:
transmit respective signaling using each transmission reception point of the set of transmission reception points, wherein the report comprising the one or more timing alignment factors is received based at least in part on the respective signaling.

30. The apparatus of claim 28, the memory and the at least one processor further configured to cause the apparatus to:
receive, from the UE, signaling indicating a capability associated with timing estimation for signals received at the UE from multiple transmission reception points, wherein the request for the timing alignment information is transmitted based at least in part on receiving the signaling indicating the capability.

* * * * *